United States Patent
Moghaddam

(10) Patent No.: US 11,123,682 B2
(45) Date of Patent: Sep. 21, 2021

(54) LIQUID DESICCANT BASED DEHUMIDIFICATION AND COOLING SYSTEM

(71) Applicant: UNIVERSITY OF FLORIDA RESEARCH FOUNDATION, INCORPORATED, Gainesville, FL (US)

(72) Inventor: Saeed Moghaddam, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 129 days.

(21) Appl. No.: 16/217,599

(22) Filed: Dec. 12, 2018

(65) Prior Publication Data

US 2019/0184334 A1    Jun. 20, 2019

Related U.S. Application Data

(60) Provisional application No. 62/598,568, filed on Dec. 14, 2017.

(51) Int. Cl.
*B01D 53/14* (2006.01)
*F24F 5/00* (2006.01)
(Continued)

(52) U.S. Cl.
CPC ....... *B01D 53/1425* (2013.01); *B01D 53/263* (2013.01); *C09K 5/047* (2013.01);
(Continued)

(58) Field of Classification Search
CPC .............. B01D 53/1425; B01D 53/263; B01D 53/268; B01D 53/28; B01D 2252/30;
(Continued)

(56) References Cited

U.S. PATENT DOCUMENTS 2,876,833 A * 3/1959 Kelley ................. F24F 3/1417
                                                   159/4.1
4,763,488 A * 8/1988 Johnston ................ B01D 1/221
                                                   159/28.6
(Continued)

FOREIGN PATENT DOCUMENTS

WO    WO-2016/081863 A1    5/2016
WO    WO-2017/198664 A1    11/2017

OTHER PUBLICATIONS

NonFinal Office Action for U.S. Appl. No. 16/384,423, dated Sep. 29, 2020, (29 pages), United States Patent and Trademark Office, USA.

(Continued)

*Primary Examiner* — Jonathan Miller
*Assistant Examiner* — Gabriel E Gitman
(74) *Attorney, Agent, or Firm* — Alston & Bird LLP

(57) ABSTRACT

A liquid desiccant system including a high desorber, a low desorber, and an absorber that are in fluid communication with a working solution, where the high desorber provides rejected water vapor from the working fluid for condensation in a condenser of the low desorber that provides heat for rejection of additional water from the working solution in the low desorber effectively multiplying the heat provided for desorption. The low desorber provided the concentrated working solution to the absorber where water from ambient air is condensed into the concentrated working solution to provide a dilute working solution within a working solution conduit of the absorber that is thermally coupled to an internal cooler of the absorber. In some embodiments, the working solution can be an aqueous solution of at least one ionic liquid.

20 Claims, 22 Drawing Sheets

(51) Int. Cl.
*B01D 53/26* (2006.01)
*F25B 15/00* (2006.01)
*F24F 3/14* (2006.01)
*C09K 5/04* (2006.01)
*F25B 15/02* (2006.01)
*B01D 53/28* (2006.01)

(52) U.S. Cl.
CPC .......... *F24F 3/1411* (2013.01); *F24F 5/0014* (2013.01); *F25B 15/00* (2013.01); *F25B 15/02* (2013.01); *B01D 53/268* (2013.01); *B01D 53/28* (2013.01); *B01D 2252/30* (2013.01); *B01D 2259/65* (2013.01); *F24F 2003/1458* (2013.01); *F25B 15/008* (2013.01)

(58) Field of Classification Search
CPC ... B01D 2259/65; C09K 5/047; F24F 5/0014; F24F 5/1411; F24F 2003/1458; F25B 15/00; F25B 15/008; F25B 15/02
See application file for complete search history.

(56) References Cited

U.S. PATENT DOCUMENTS

| | | | |
|---|---|---|---|
| 5,512,084 A * | 4/1996 | Mauterer | F28F 9/26 95/199 |
| 6,314,752 B1 * | 11/2001 | Christensen | F25B 15/00 62/484 |
| 6,564,572 B1 * | 5/2003 | Uchimura | F25B 37/00 62/476 |
| 2006/0272344 A1 | 12/2006 | Tongue | |
| 2011/0088418 A1 * | 4/2011 | Kontomaris | C09K 5/047 62/101 |
| 2011/0247494 A1 | 10/2011 | Dinnage et al. | |
| 2014/0238072 A1 | 8/2014 | Moghaddam | |
| 2017/0003058 A1 * | 1/2017 | Andersson | F25B 39/00 |
| 2017/0056817 A1 * | 3/2017 | van der Ham | B01D 19/0073 |
| 2019/0299123 A1 | 10/2019 | Verplancke | |

OTHER PUBLICATIONS

Anaredy, Radhika S. et al. "Adventitious Water Sorption in a Hydrophilic and a Hydrophobic Ionic Liquid—Analysis and Implications," ACS Omega, vol. 1, No. 3, pp. 407-416, Sep. 16, 2016.
Gluesenkamp, Kyle R. et al. "Efficiency Analysis of Semi-Open Sorption Heat Pump Systems," Renewable Energy, vol. 110, pp. 95-104, Sep. 2017.
Qiao, Yunxiang et al. "Temperature-Responsive Ionic Liquids: Fundamental Behaviors and Catalytic Applications," Chemical Reviews, vol. 117, No. 10, pp. 6881-6928, May 24, 2017. DOI: 10.1021/acs.chemrev.6b00652. Epub Mar. 30, 2017. PMID: 28358505.
Final Office Action for U.S. Appl. No. 16/384,423, dated Feb. 26, 2021, (25 pages), United States Patent and Trademark Office, USA.
Notice of Allowance for U.S. Appl. No. 16/384,423, dated May 19, 2021, (14 pages), United States Patent and Trademark Office, USA.

* cited by examiner

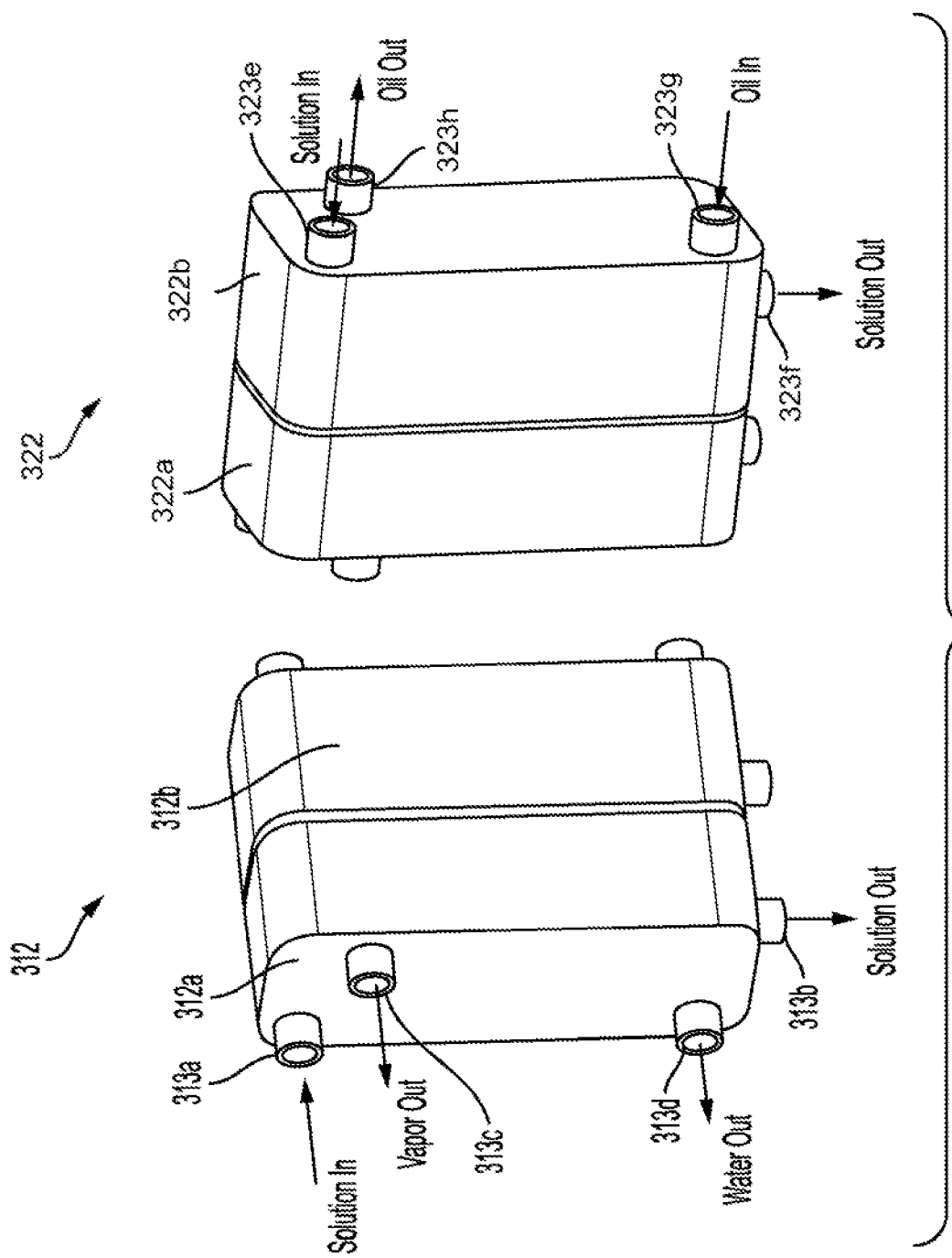

US 11,123,682 B2

LIQUID DESICCANT BASED DEHUMIDIFICATION AND COOLING SYSTEM

CROSS-REFERENCE TO RELATED APPLICATIONS

This application claims priority to and the benefit of U.S. Provisional Application Ser. No. 62/598,568, filed Dec. 14, 2017, titled "Liquid Desiccant Based Dehumidification and Cooling System," the disclosure of which is hereby incorporated by reference in its entirety.

STATEMENT OF GOVERNMENT SUPPORT

This invention was made with government support under grant number DE-EE0006718, awarded by the Department of Energy (DOE). The government has certain rights in the invention.

BACKGROUND

Cooling systems are a pillar of modern civilization that have greatly enhanced our standard of living and enabled the development of large population centers, even in very harsh climates. Globally, cooling systems consume a large fraction of the electrical energy supply and are a significant contributor to peak power load. As demand for air conditioning rapidly increases in emerging economies, cooling systems are expected to further strain the power grid. The energy consumed in residential and commercial buildings represents over one-third of global and approximately 40% of the total US energy consumption. This, within the US, represents approximately 38 quadrillion British thermal units (quads) of primary energy. Within the US residential and commercial building sector, water heating (3.8 quads) and heating, ventilation and air conditioning (HVAC) (15.2 quads) represent half of the energy consumed. It is estimated that the global air-conditioning energy demand will increase by 72% by 2100, due to a significant increase in air conditioning demand in developing countries. The ability to meet even a portion of the increased demand for electricity will be a significant challenge, requiring trillions of dollars in investments in electricity generation and transmission infrastructure. While multiple sources, natural gas, electricity, fuel oil, propane, solar, etc., of energy are used for water heating, electricity is the predominant source of energy used for HVAC applications. These systems are also responsible for the release of high global warming potential (GWP) refrigerants. There are very limited low GWP refrigerants replacement options for existing high GWP refrigerants highlighting a pressing need to reduce reliance on the vapor compression systems that currently dominate the cooling market. To adequately slow the growth in energy consumption and environmental impacts of cooling systems, changes are required to both buildings and heating, ventilation, and air conditioning (HVAC) systems. To date, the implementation of building changes using energy saving measures such as addition of more insulation, better windows, and sealed air barriers have outpaced changes in the associated HVAC systems. The result, particularly in small buildings ill-equipped to actively control humidity, is increased humidity levels and poor Indoor Air Quality (IAQ).

BRIEF SUMMARY

Embodiments of the invention are directed to liquid desiccant dehumidification systems (LDDSs), for instance double-effect LDDSs, having at least one high desorber, at least one low desorber, and at least one absorber. The high desorber is configured with the low desorber for condensation of water evaporated from a working solution within the high desorber in a condenser, e.g., for heating the low desorber. The working solution from the low desorber is configured with the absorber for condensation of water from ambient air into the working solution within a working solution conduit of the absorber. In some embodiments, the absorber may include an internal cooler. In some embodiments, the working solution is an aqueous solution that includes at least one ionic liquid (IL). The double-effect LDDS can have a high heat exchanger thermally coupling portions of the working solution that is situated downstream of the high desorber, upstream of the low desorber, and downstream of the absorber with respect to the flow of the working solution in the double-effect LDDS. The double-effect LDDS can have a low heat exchanger thermally coupling portions of the working solution that is situated downstream of the low desorber and upstream of the absorber with respect to the flow of the working solution in the double-effect LDDS. The double-effect LDDS can include a low heat exchanger thermally coupling portions of the working solution that is situated downstream of the low desorber, upstream of the absorber, and upstream of the high desorber with respect to the flow of the working solution in the double-effect LDDS. Advantageously, the IL can be non-crystallizable.

In some embodiments, a desorber can be configured to increase the concentration of desiccant in the working solution. A desorber can be configured to desorb water from a heated working solution comprising a desiccant and water vapor. In some embodiments, the desorber can comprise a desorber housing comprising a first housing portion and a second housing portion, the first housing portion at least partially defining a first portion of an inner volume of the desorber housing and the second housing portion at least partially defining a second portion of the inner volume of the desorber housing. In some embodiments, a first plurality of diffusion plates disposed within the first portion of the inner volume of the desorber housing, the first plurality of diffusion plates defining a first one or more apertures therethrough. In some embodiments, a second plurality of diffusion plates disposed within the second portion of the inner volume of the desorber housing, the second plurality of diffusion plates defining a second one or more apertures therethrough. In some embodiments, the first one or more apertures are dimensioned and configured such that water vapor can be directly desorbed through the first one or more apertures at a temperature of between about the boiling point temperature of water (e.g., about 100° C.) and about a boiling point of the desiccant. In some embodiments, the desorber being configured to directly desorb at least a portion of the water vapor from the working solution in a still air environment.

In some embodiments, the first housing portion can define a first working solution inlet port, a vapor outlet port, a water outlet port, and/or a first working solution outlet port. In some embodiments, the second housing portion defining a second working solution inlet port, a heat exchange fluid inlet port, a heat exchange fluid outlet port, and/or a second working solution outlet port. In some embodiments, each diffusion plate of the first plurality of diffusion plates can be substantially rectangular in shape. In some embodiments, each diffusion plate can include a first aperture offset in a radial direction from a radial axis of each diffusion plate of the first plurality of diffusion plates. In some embodiments, a second aperture offset in an opposite radial direction from the radial axis of each diffusion plate of the first plurality of diffusion plates. In some embodiments, the second aperture defined parallel to the first aperture and having the same dimensions.

In some embodiments, the first plurality of diffusion plates are stacked together to form a first diffusion plate stack. In some embodiments, the first diffusion plate stack at least partially defining a first fluid flow path through the first housing portion of the desorber housing. In some embodiments, the first aperture and the second aperture can be configured to reduce the first fluid flow path such that water vapor diffuses more rapidly through the first diffusion plate stack. In some embodiments, each diffusion plate of the second plurality of diffusion plates is substantially rectangular in shape. In some embodiments, each diffusion plate of the second plurality of diffusion plates can include a third aperture defined linearly through each plate of the second plurality of diffusion plates in an axial direction and centered radially. In some embodiments, the second plurality of diffusion plates are stacked together to form a second diffusion plate stack. In some embodiments, the second diffusion plate stack at least partially defines a second fluid flow path through the second housing portion of the desorber housing greater than the first fluid flow path through the first housing portion of the desorber housing. In some embodiments, the second diffusion plate stack can be configured to exchange thermal energy with a heat exchange fluid.

In some embodiments, the working solution comprises an ionic liquid (IL) and water. In some embodiments, the IL is non-crystallizable. In some embodiments, the IL can include one or more of Evonik CrysCo Plus 2200, Evonik CrysCo Plus 2630, piSorb 275, and Sorbionic4, imidazolium-containing materials, 1-butyl-3-methylimidazolium bis(trifluoromethylsulfonyl)imide, 1-ethyl-3-methylimidazolium bis(trifluoromethyl-sulfonyl)amide, tetra-nbutylphosphonium trifluoromethanesulfonyl leucine, N-alkyl-N,N-dimethylhydroxyethylammoniumbis(trifluoromethane) sulfonylimidelithium bromide, lithium chloride, calcium chloride, combinations thereof, or the like.

A method for increasing a concentration of the desiccant in the working solution and cooling the working solution can be carried out using the desorber described above. In some embodiments, the method can include charging the heated working solution into the first portion of the inner volume of the desorber housing. In some embodiments, the method can include communicating the heated working solution along the first fluid flow path such that at least a first portion of water vapor desorbs from the heated working solution and is communicated out of the desorber, forming a concentrated working solution. In some embodiments, the method can include communicating the concentrated working solution from the first portion of the inner volume of the desorber housing into the second portion of the inner volume of the desorber housing. In some embodiments, the method can include communicating the first concentrate working solution along the second fluid flow path such that the heat exchange fluid removes heat from the concentrated working solution.

According to other embodiments, an LDDS can include an absorber configured to absorb water from a process air (i.e., to dehumidify the process air). In some embodiments, the absorber plate can include a central channel having a first surface and a second surface. In some embodiments, a first desiccant solution channel having a first surface and a second surface and configured to communicate a first portion of the desiccant solution therethrough. In some embodiments, the first surface of the first desiccant solution channel can be coupled to the first surface of the central channel. In some embodiments, the first surface of the first desiccant solution channel can be an engineered surface configured to slow down the spread of the first portion of the desiccant solution as it is communicated across the first surface. In some embodiments, the first surface of the first desiccant solution channel can include solid features, apertures therethrough, or the like. In some embodiments, a plurality of fins or other solid features can be disposed on the first surface of the first desiccant solution channel. In some embodiments, the first surface of the first desiccant solution channel can be hydrophilic. In some embodiments, a first membrane, for instance a hydrophobic membrane, can have a first surface and a second surface. In some embodiments, the second surface of the first membrane can be fluidically coupled to the desiccant solution channel. In some embodiments, the first surface of the first membrane and the first portion of the desiccant solution can be configured to absorb water vapor from process air nearby the first membrane. In some embodiments, a second desiccant solution channel can have a first surface and a second surface. In some embodiments, the second desiccant solution channel can be configured to communicate a second portion of the desiccant solution therethrough. In some embodiments, the first surface of the second desiccant solution channel can be coupled to the second surface of the central channel. In some embodiments, the first surface of the second desiccant solution channel can be an engineered surface configured to slow down the spread of the first portion of the desiccant solution as it is communicated across the first surface. In some embodiments, the first surface of the second desiccant solution channel can include solid features, apertures therethrough, or the like. In some embodiments, a plurality of fins or other solid features can be disposed on the first surface of the second desiccant solution channel. In some embodiments, the first surface of the second desiccant solution channel can be hydrophilic. In some embodiments, a second membrane, for instance a hydrophobic membrane, can have a first surface and a second surface. In some embodiments, the second surface of the second membrane can be fluidically coupled to the desiccant solution channel. In some embodiments, the first surface of the second membrane and the second portion of the desiccant solution can be configured to absorb water vapor from process air nearby the second membrane.

All components of the absorber can include or be formed from a polymer material. The internal cooler can be a conduit of cooling water contacting the working solution conduit of the absorber and can be situated within a closed loop flow path comprising a cooling fluid. The closed loop comprises a fluid radiator for cooling the cooling fluid by the ambient air. The internal cooler can be an evaporator connected to a water source, wherein the water from the water source evaporates in the internal cooler. The high desorber can be coupled to a heater by a heating fluid. The absorber can be constructed of one or more polymers.

In some embodiments, the desiccant solution can include an ionic liquid (IL), such as a non-crystallizable IL. In some embodiments, the IL can include one or more of Evonik CrysCo Plus 2200, Evonik CrysCo Plus 2630, piSorb 275, imidazolium-containing materials, and Sorbionic4, 1-butyl-3-methylimidazolium bis(trifluoromethylsulfonyl)imide, 1-ethyl-3-methylimidazolium, 1-ethyl-3-methylimidazolium bis (trifluoromethyl-sulfonyl)amide, tetra-nbutylphosphonium trifluoromethanesulfonyl leucine, N-alkyl-N,N-dimethylhydroxyethylammoniumbi s(trifluoromethane)sulfonylimidelithium bromide, lithium chloride, calcium chloride, combinations thereof, or the like. In some embodiments, the central channel can be a heat exchange channel configured to communicate a heat exchange fluid therethrough. In some embodiments, the first surface of the first desiccant solution channel can be thermally coupled to the first surface of the central channel. In some embodiments, the first surface of the second desiccant solution channel can be thermally coupled to the second surface of the central channel. In some embodiments, the absorption of water from the process air nearby the first membrane, e.g., a first hydrophobic membrane, and the second membrane, e.g., a second hydrophobic membrane, can cause the process air to heat the heat exchange fluid being communicated through the heat exchange channel.

All components of the absorber can include or be formed from a polymer material. The internal cooler can be a conduit of cooling water contacting the working solution conduit of the absorber and can be situated within a closed loop flow path comprising a cooling fluid. The closed loop comprises a fluid radiator for cooling the cooling fluid by the ambient air. The internal cooler can be an evaporator connected to a water source, wherein the water from the water source evaporates in the internal cooler. The high desorber can be coupled to a heater by a heating fluid. The absorber can be constructed of one or more polymers.

In some embodiments, a method of dehydrating air can be carried out using an absorber such as the absorber described above. In some embodiments, the method can include communicating a first portion of the working solution through the first desiccant solution channel and a second portion of the second desiccant solution channel. In some embodiments, the method can include disposing process air nearby the first membrane and the second membrane such that water vapor is absorbed from the process air into the first and second portions of the desiccant solution. In some embodiments, the method can include communicating a heat exchange fluid through the central channel such that, during the absorption of water from the process air, the process air can heat the heat exchange fluid. In some embodiments, the desiccant can include an ionic liquid, for instance a non-crystallizable ionic liquid. In some embodiments, the ionic liquid can include one or more of: imidazolium-containing materials, 1-butyl-3-methylimidazolium bis(trifluoromethylsulfonyl)imide, 1-ethyl-3-methylimidazolium bis(trifluoromethyl-sulfonyl)amide, tetra-nbutylphosphonium trifluoromethanesulfonyl leucine, N-alkyl-N,N-dimethylhydroxyethylammoniumbis(trifluoromethane)sulfonylimide, or the like.

In some embodiments, a liquid desiccant dehumidification system (LDDS) can include an absorber configured to communicate water vapor from a humid air flow into a first concentrated desiccant solution to form a dilute desiccant solution. In some embodiments, the first concentrated desiccant solution can include an aqueous solution of at least one ionic liquid and being capable of absorbing water. In some embodiments, a first heat exchanger can be thermally coupled to the dilute desiccant solution such that heat generated during communication of water vapor from the humid air flow into the concentrated desiccant solution can be exchanged with a first exchange medium. In some embodiments, the LDDS can further include a first desorber fluidically coupled to the absorber and thermally coupled to the first heat exchange medium. In some embodiments, the first desorber can be configured to heat the dilute desiccant solution in a stack of desorption plates to desorb water vapor from the dilute solution to concentrate the dilute desiccant solution into the concentrated desiccant solution. In some embodiments, the first desorber having an operating temperature of between about the boiling point temperature of water (e.g., about 100° C.) and the boiling point temperature of one or more desiccants.

In some embodiments, the LDDS can further include a second heat exchanger thermally coupled to the first desorber such that thermal energy from the first desorber can be conducted into a second exchange medium. In some embodiments, the LDDS can further include a second desorber fluidically coupled to the first desorber such that the intermediate desiccant solution can be communicated therebetween and thermally coupled to the second heat exchange medium. In some embodiments, the second desorber can be configured to desorb at least a portion of the water vapor from the dilute desiccant solution, thereby desorbing water vapor from the dilute desiccant solution to form a second concentrated desiccant solution having substantially the same concentration of ionic liquid as the first concentrated desiccant solution.

Another embodiment of the invention is directed to a dedicated outdoor air system (DOAS), including at least one double-effect LDDS and at least one air conditioning (HVAC) unit. At least one evaporator of a HVAC unit is in thermal communication with air dried by the absorber of the double-effect LDDS. The evaporator of a HVAC unit can be thermally coupled to the internal cooler of the absorber. The condenser of the HVAC unit can be thermally coupled with at least one of the high desorber and the low desorber.

Another embodiment of the invention is directed to a method for dehydrating ambient air by contacting ambient air with a concentrated working solution in an absorber of a double-effect LDDS, condensing the water in the ambient air in the concentrated working solution to form a dilute working solution, and evaporating the water from the dilute working solution in the high desorber and the low desorber.

BRIEF DESCRIPTION OF DRAWINGS

FIG. 6A shows a compact double desorber, according to an embodiment.

DETAILED DISCLOSURE

Figure 1:
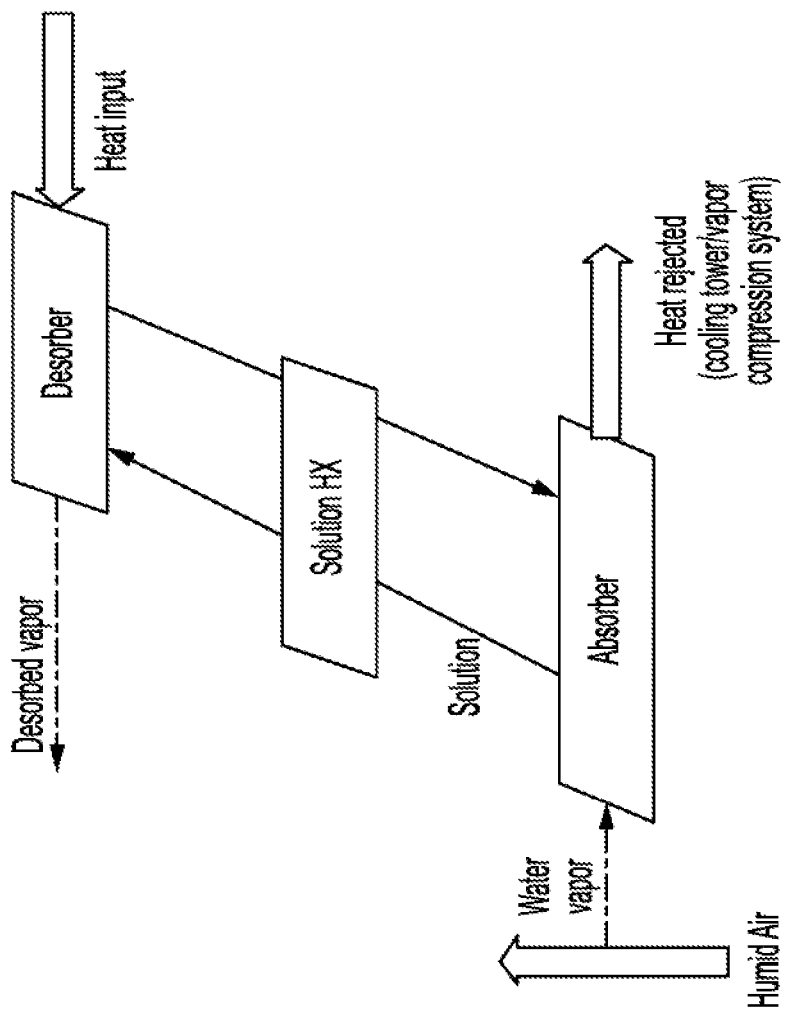
FIG. 1 shows a schematic for a prior art single effect liquid desiccant dehumidification system (LDDS), according to an embodiment.

The challenge of high humidity levels is not limited to low-load buildings. Buildings in hot and humid climates have always had this challenge. When significant humid fresh air is used, relative humidity (RH) can reach unacceptable levels even with the use of a dedicated direct expansion (DX) dehumidification (DH) system. This challenge will be exacerbated in residential buildings with the implementation of ASHRAE Standard 62.2-2016 ventilation, as it will create a new demand for supplemental dehumidification units. Although it is well known that the latent load associated with fresh air treatment is always higher than the sensible load in much of the US, it can be nearly half of the total building load in hot and humid climates. Measurement of load distribution in a 3-story 225-person office building in Tampa, Fla. showed that latent load due to ventilation accounted for 45% of the entire building load, leading to a sensible heat ratio (SHR) of less than 0.45 when all latent loads were considered. In the off-peak conditions, the situation can get much worse, since sensible load declines proportionally with the outdoor temperature while latent load does not, leading to a SHR of zero.

The trend of the SHR towards zero exacerbates the need to dry the ventilation air in a hot and humid climate before mixing it with the return air, because the existing DX cooling systems are not capable of handling such a high latent load level. The existing vapor compression cooling process capability set by its operation principle, which requires sub-cooling of air to condense moisture with a thermostat driven demand and on/off cycling, is limited to a SHR range of 1 to 0.65. Systems augmented with absorbents, such as hybrid DX and desiccant wheel systems, can extend this range with series regeneration configuration to an SHR of between about 0.4 and about 0.45.

The fundamental dehumidification principle of DX systems is the condensation of air moisture, where the inability to effectively handle increased indoor moisture levels have resulted in contaminated HVAC units as well as the creation of indoor environments that result in the degradation of occupant's health. Poor IAQ leads to inefficient work environments and increases risk of respiratory infections and allergies. It is estimated that the potential annual savings and productivity gains from improved IAQ in the United States can be as high as $14 billion from reduced respiratory disease, $4 billion from reduced allergies and asthma, $30 billion from reduced sick building syndrome, and $160 billion from direct improvements in worker performance that are unrelated to health. Experimental studies on air-borne-transmitted infectious bacteria and viruses have shown that the survival rate or infectivity of these organisms is minimized by exposure to relative humidity levels between 30 and 60%, with 50% being the optimal point. This range of relative humidity is not currently achievable in all buildings, particularly in hot and humid climates, using typical vapor compression (VC) systems.

To significantly impact the energy profile of HVAC systems, systems must be configured for building specific applications and climate, as well as the use of a variety of technologies and fuel types (electricity, gas, solar, etc.). The ability to separately handle building sensible and latent heat load facilitates the cost-effective tailoring of building HVAC configurations, and the ability to address the poor Indoor Air Quality (IAQ) issues resulting from poor indoor humidity control. A significant change in the energy consumption profile for building HVAC and water heating systems requires new energy efficient technologies. These technologies should represent a leap in energy efficiency, breaking the cycle of small incremental efficiency improvements of existing technology.

The vapor compression or direct expansion (DX) process is not capable of handling sensible and latent heat separately. To remove moisture from air, existing systems must often overcool air to saturation conditions. The ability to efficiently reduce the air moisture content without cooling it can enable much more efficient HVAC systems capable of handling the sensible and latent loads separately (allowing independent control of humidity and temperature levels in buildings). Liquid desiccant technology can play a key role in achieving this objective if high efficiency, low-cost, scalable and robust systems can be developed. However, this potential has not materialized despite a few decades of research and development. Current single-effect liquid desiccant technology has a low energy efficiency (a COP of 0.6-0.7) and needs a means of removing the absorber heat; for example, the evaporator of a DX system. The need for this secondary cooling system along with a low desiccant regeneration efficiency negate the energy saving benefit of the system, while increasing the HVAC system cost.

A conventional single effect liquid desiccant dehumidification system (LDDS) is shown in FIG. 1. A hygroscopic salt solution removes water vapor from the air in the absorber. The heat of phase change should be removed from the absorber and heat is required to regenerate the desiccant solution in the desorber. Unfortunately, implementation of this system has remained limited due to two factors: the cycle is less energy efficient than DX systems; and the requirement of a means of removing the absorber heat, typically a wet cooling tower (or an integrated evaporative cooling medium) or coupling with the evaporator of a DX system. To provide energy savings, the desiccant regeneration heat must be free, provided by the condenser of a DX system or an engine, fuel cell, or other heat source. To this end a superior desiccant dehumidification system is desirable.

According to an embodiment of the invention, a system for dehumidification and/or air conditioning can enable the implementation of absorption systems for buildings and industrial applications. This new architecture can reduce or eliminate the need for hermetic components leading to simpler designs with reduced complexity thereby greatly reducing the system cost. The implementation of this architecture can be dependent on membrane-based plate-and-frame heat exchangers, the implementation of ionic liquids (ILs) as the cycle absorbent as well as other technologies to maximize system efficiency and performance. The membrane-based plate-and-frame heat exchangers may reduce the component size and cost while fully containing the absorbent. In these heat exchangers, 3D surface structures can be utilized to control the absorbent film thickness and induce mixing to enhance mass transfer.

Figure 2:
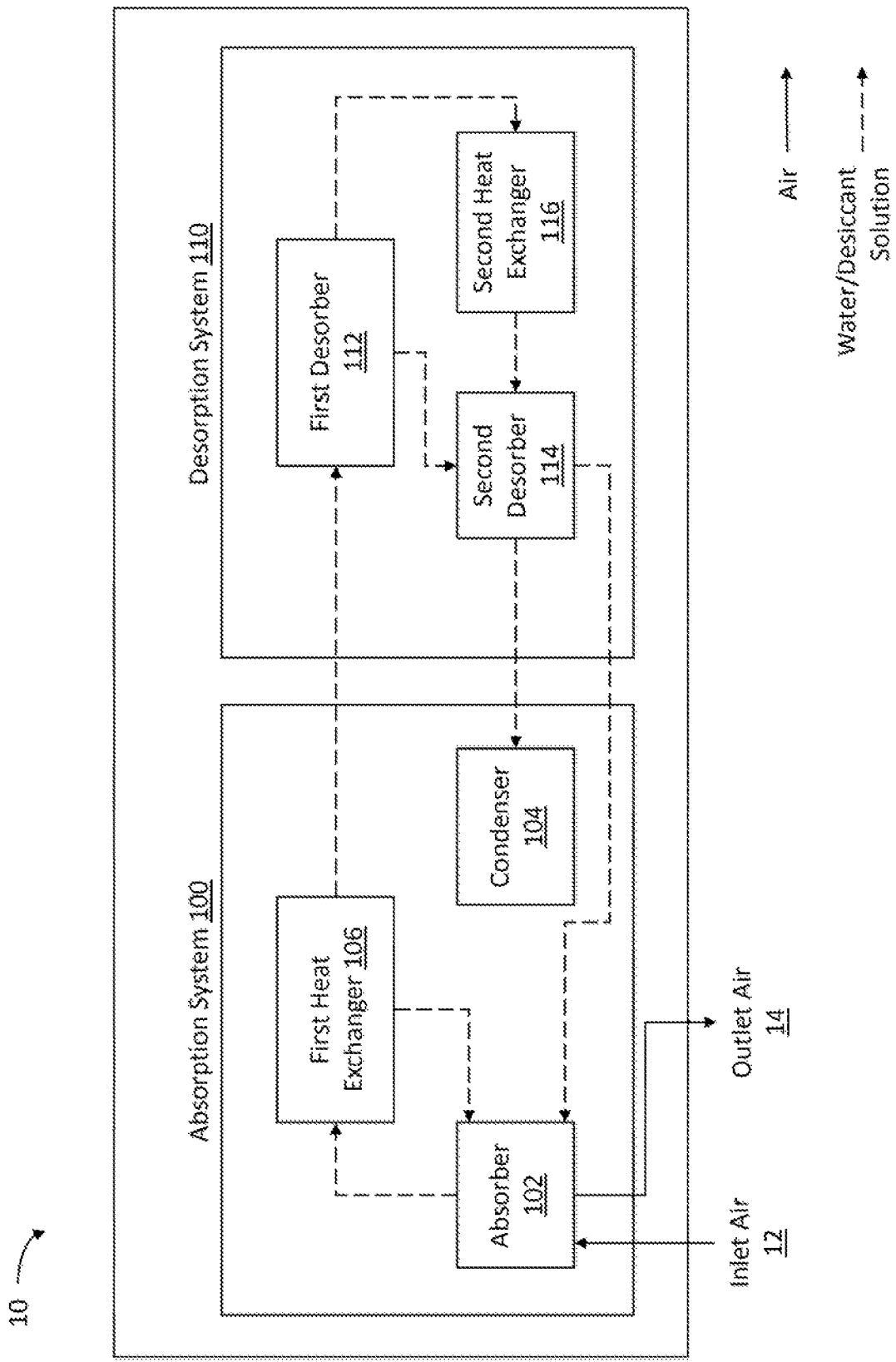
FIG. 2 is a block diagram illustrating a double-effect LDDS, according to an embodiment.
Figure 3:
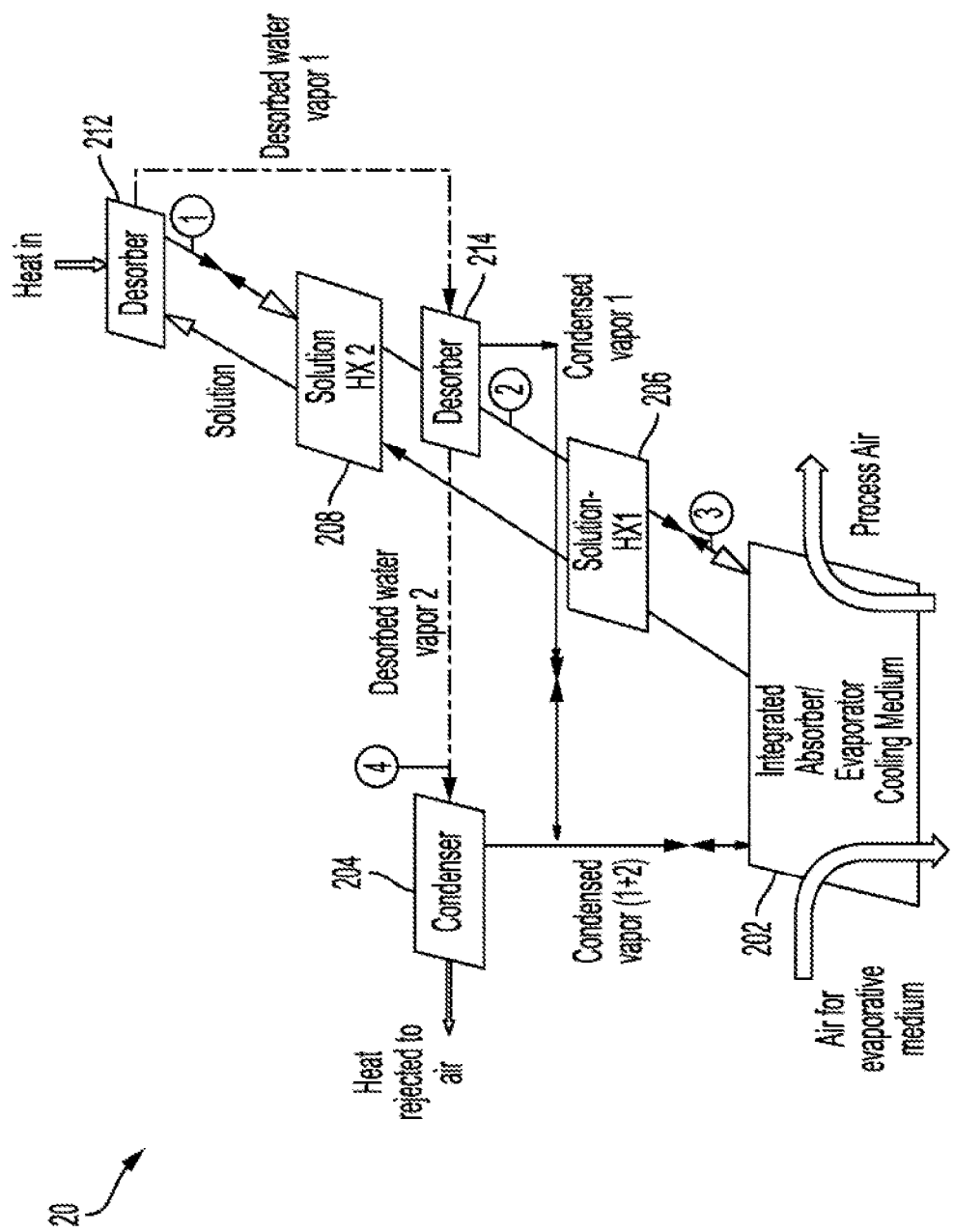
FIG. 3 shows a schematic for a double-effect LDDS for coupling with a HVAC system, according to an embodiment.

According to an embodiment of the invention, a double-effect semi-open liquid desiccant system (LDDS) that can be a standalone system or coupled to other systems to implement sensible and latent cooling and drying, for example as shown in FIGS. 2 and 3, can from a primary energy perspective approximately double the energy efficiency of a LDDS. The double-effect semi-open LDDS is a standalone system that is 40-50% more efficient than the average DX system for dehumidification within the US. The semi-open arrangement allows for recovery of all the absorbed water and its use for absorber cooling in an integrated evaporative cooling configuration.

Briefly, LDDSs operate by removing moisture from the inlet air in a dehumidification unit or an absorber unit using a desiccant (e.g., a salt, a silica gel, or the like) to absorb water vapor from process air, forming a dilute solution comprising the desiccant and water. Mass transfer in the system occurs due to vapor pressure differences, and heat is given off during the condensation of water from water vapor and during heat exchange due to mixing. The dehumidified process air can then be cooled and/or introduced into the indoor space. The dilute solution, now comprising the desiccant and an elevated concentration of water condensed from the water vapor in the inlet air, can be regenerated. The dilute solution can be regenerated by first passing the desiccant solution through a first liquid-liquid heat exchanger and then a heating coil to raise the temperature of the dilute solution, such that water from the dilute solution migrates from the dilute solution due to a vapor pressure differential, forming a concentrated solution comprising the desiccant and relatively little water. The concentrated solution can then be passed through a second liquid-liquid heat exchanger and then a cooling coil to lower the temperature of the concentrated solution, and be used again in the dehumidification process to remove water vapor from the inlet air.

FIG. 2 illustrates such a LDDS (10) comprising an absorption system 100 and a desorption system 110. In some embodiments, the LDDS 10 can comprise a packed-bed absorption system, a plate heat exchanger system, a multi-stage boiler system, a collector/regenerator system, combinations thereof, or the like. The absorption system 100 can include an absorber 102 configured to receive an inlet air 12 (e.g., hot-humid outdoor air), remove at least a portion of the water vapor from the inlet air 12 to form an outlet air 14, and communicate the outlet air 14 out of the system. Optionally, the LDDS 10 or a component thereof (e.g., the absorber 102) can be configured to communicate at least a portion of the outlet air 14 to further processing unit such as a cooling system (not shown) such as an evaporative cooling tower, a central air conditioner, a heat pump, a room air conditioner, an evaporative cooler, a ductless mini-split air conditioner, a split system, a single-split system, a multi-split system, a variable refrigerant flow (VRF) system, a variable refrigerant volume (VRV) system, a variable air volume (VAV) system, a constant air volume (CAV) system, combinations thereof, or the like.

In some embodiments, the LDDS 10 can comprise a first vapor compression cycle dealing with sensible cooling load and a second vapor compression cycle to deal with latent cooling demand from indoor and outdoor air, otherwise known as a separate sensible and latent cooling (SSLC) system. In some embodiments, sensible and latent heat exchangers can be arranged in sequence along the air processing flow direction. Return air can be mixed with outdoor fresh air before flowing into the sensible evaporator. After it passes through the sensible evaporator, air flow can be divided into two streams: one stream being sent to the reheat heat exchanger for pre-cooling, and processed through the latent evaporator while the other stream is bypassed. The air stream exiting the latent evaporator can then be reheated through the reheat heat exchanger, and mixed with the second stream that was bypassed.

In some embodiments, the absorber 102 can comprise a plate or a web or another such complex surface configured to communicate the liquid desiccant solution across the surface of the absorber while the inlet air 12 is communicated past the liquid desiccant, such as Evonik CrysCo Plus 2200, Evonik CrysCo Plus 2630, piSorb 275, and Sorbionic4, 1-butyl-3-methylimidazolium bis(trifluoromethylsulfonyl)imide, 1-ethyl-3-methylimidazolium bis (trifluoromethyl-sulfonyl)amide, tetra-nbutylphosphonium trifluoromethanesulfonyl leucine, N-alkyl-N,N-dimethylhydroxyethylammoniumbis(trifluoromethane) sulfonylimidelithium bromide, lithium chloride, calcium chloride, combinations thereof, or the like. In some embodiments, the ionic liquid can include one or more of 1-butyl-3-methylimidazolium bis(trifluoromethylsulfonyl)imide, 1-ethyl-3-methylimidazolium bis(trifluoromethyl-sulfonyl)amide, tetra-nbutylphosphonium trifluoromethanesulfonyl leucine, N-alkyl-N,N-dimethylhydroxyethylammoniumbis(trifluoromethane) sulfonylimide, or the like. Further discussion of desiccants, the use thereof, and the implications for dehumidification efficiency in the systems described herein are described further below.

Upon contact with the liquid desiccant, at least a portion of the water vapor in the inlet air 12 condenses out of the inlet air 12 and goes into solution with the liquid desiccant, forming the dilute solution and generating heat due to condensation. In some embodiments, the absorber 102 can comprise a hollow plate or other structure such that an exchange medium can heat the dilute solution. In some embodiments, the absorber 102 can comprise an integrated absorber/evaporator cooling system. In some embodiments, the absorber 102 can be configured to defuse the inlet air 12 across a volume or surface area of desiccant material. In some embodiments, the absorber 102 can be configured to increase the surface area of liquid desiccant solution such that more inlet air 12 comes into contact with liquid desiccant solution during operation of the absorber 102.

In some embodiments, either the absorption system 100 and/or the desorption system 110 can further include a condenser 104 configured to condense water vapor from high relative humidity air into liquid water, giving off heat in the process. In some embodiments, the condenser 104 can be configured to receive desorbed water vapor and provide water to an evaporative cooling system (e.g., the integrated absorber/evaporator cooling unit). In some embodiments, the absorption system 100 can further include a first heat exchanger 106 configured to carry out liquid-liquid heat exchange between the strong solution from the second desorber 114, and the dilute solution from the absorber 102, in order to raise the temperature of the dilute solution. In some embodiments, after heating the dilute solution, e.g., to above a threshold temperature, for a predetermined duration, or the like, the dilute solution can be communicated to the desorption system 110.

The desorption system 110 can include a first desorber 112 configured to heat the dilute solution and directly desorb or diffuse a portion of the water vapor from the dilute solution, through a porous plate stack or the like such that the liquid desiccant concentration is increased, forming an intermediate solution. Whereas conventional desorption processes require a low humidity air supply (i.e., a scavenger air supply) to cause water or water vapor from dilute desiccant solutions to evaporate or desorb, embodiments of the desorption system 110 can carry out desorption of water vapor from the dilute desiccant solution with low or no air introduced at relatively higher temperatures. Without wishing to be bound by any particular theory, the direct desorption of water vapor from the dilute desiccant solution in a still air environment may result in a more thermally efficient process because the evaporative cooling of conventional air scavenging desorption processes is avoided, which means more of the thermal energy is retained in the system to be exchanged and put to work elsewhere in the process. In some embodiments, the heat can be captured by an exchange medium in a second heat exchanger 116, the second heat exchanger 116 being in thermal communication with the dilute solution and/or the first desorber 112. In some embodiments, at least a portion of the intermediate solution can then be communicated to a second desorber 114.

In some embodiments, the second desorber 114 can be configured to receive the intermediate solution and desorb at least a portion of the remaining water or water vapor from the intermediate solution, such as described above with regard to the first desorber 112, forming the concentrated solution. Once concentrated solution is formed at the second desorber 114, it has been regenerated for subsequent desiccation purposes by the absorber 102. The desorbed water vapor from the second desorber 114 can be exhausted to the outdoors or communicated to the condenser 104 such that water vapor can be condensed, from which the heat of condensation can be exchanged with a heat exchange medium and put to work elsewhere in the process.

As shown in FIG. 2, the first desorber 112 provides desorbed water vapor to the second desorber 114, which aids during regeneration of the intermediate solution to the concentrated solution by the second desorber 114. In some embodiments, the desorbed water vapor from the first desorber 112 can be used to heat the outlet air 14. In some embodiments, at least a portion of the desorbed water vapor from the first desorber 112 can be used to heat the second desorber 114, thereby condensing the desorbed water vapor from the first desorber 112. In some embodiments, the thermal energy from the desorbed water vapor from the first desorber 112 can be used to heat the working solution as it enters the second desorber 114. At least one of the desorbed water vapor from the first desorber 112 or the desorbed water vapor from the second desorber 114 can be communicated to the condenser 104.

FIG. 3 illustrates a LDDS 20 comprising an integrated absorber/evaporator cooling medium unit 202, a condenser 204 configured to provide condensed water vapor to the integrated absorber/evaporative cooling unit 202 for evaporative cooling, a first heat exchanger 206 and/or a second heat exchanger 208 configured to exchange the heat from the integrated absorber/evaporative cooling unit 202 with an exchange medium. As water or water vapor is absorbed from process air by the desiccant (e.g., liquid desiccant), the water or water vapor dilutes the desiccant to form a dilute desiccant solution, which can be regenerated by desorption processes. The LDDS 20 can include a first desorber 212 configured to remove water from the dilute desiccant solution, forming an intermediate solution and causing cooling of at least one of the intermediate solution(s) and/or the desorbed water vapor. The LDDS 20 can further include a second desorber 214 configured to receive at least a portion of the intermediate solution from the first desorber 212 and remove water from the intermediate solution, forming a concentrated solution that has been at least substantially regenerated. The LDDS 20, similar to the LDDS 10 and others described through this disclosure, can be classified as a semi-open system. One of the key differences between the semi-open system (e.g., LDDS 20) and a conventional open system is the addition of a condenser that condenses the vapor released from the desorber, among other differentiating factors or elements. As described herein, the desorber can be a single-plate desorber, a multi-plate desorber, or the like. In some embodiments, the desorber 212 and/or 214 can be heated by a heating fluid, indirectly via solar thermal configurations, heated via direct firing from gas combustion, steam, or the like. The double-effect configuration allows the use of vapor generated in the first desorber 212 for regeneration of solution in the second desorber 214. Without wishing to be bound by any particular theory, the use of vapor generated in the first desorber 212 for regeneration of the desiccant solution in the second desorber 214 may be at least partially responsible for the higher cycle efficiency, for instance, since one heat input step allows two solution regeneration steps. Furthermore, since the first desorber 212 may operate without the use of scavenger air for desorption/evaporation purposes with respect to the removal of water or water vapor from the desiccant solution, the cooling of the desiccant solution associated with desorption/evaporation using scavenger air can be avoided and the intermediate desiccant solution need not be subsequently re-heated in order to be regenerated in the second desorber 214. In some embodiments, the condenser 204 can be configured to reject heat to ambient air. The condensate can then be used in an evaporative cooling process at the integrated absorber/evaporative cooling unit 202 to cool process streams at the unit 202, such as the desiccant solution, the dilute desiccant solution, the process air, or the like. This evaporative cooling capacity can employ greater than or equal to about 90% of the absorber heat rejection, with the heat of mixing being less than or equal to about 10%. Depending on whether the ambient, at either peak or off-peak temperature, or exhaust air is used for cooling the absorber, the system may or may not require makeup water, respectively.

This double-effect semi-open LDDS 20 represents a compact, efficient, robust, and cost-effective technology that can enable widespread adoption and realization of significant energy savings, particularly in the existing building stock and industrial dehumidification processes. The double-effect semi-open LDDS 20 can be configured and sized appropriate for the required load in a variety of ways to address specific building/climate needs. In addition to using larger sized components and devices, a plurality of double-effect semi-open LDDS 20 systems, components of the system, and/or portions of components can be employed in a cooling system. Double-effect LDDSs (e.g., LDDS 10, LDDS 20, etc.) can rapidly enter the retrofit market as a dedicated outdoor air system (DOAS), a stand-alone building latent load handling unit, a substitute for the less-efficient and water-consuming element of liquid desiccant cooling systems, or as a standalone or component of industrial dehumidification/drying systems.

In some embodiments, the double-effect semi-open LDDS 20 can include a semi-open absorption cycle, a compact membrane-based absorber, non-crystallizing ionic liquids (ILs), and highly efficient solution heat exchangers. In some embodiments, the absorber 202 can comprise an open or semi-open membrane-based absorber. Open absorbers are fundamentally different than closed absorbers. Without wishing to be bound by any particular theory, the presence of air in an open absorber system may lead to an order of magnitude lower absorption rate when compared to a closed absorber. In some embodiments, to overcome this disadvantage of the open absorber system, the absorber surface area can be drastically increased. To provide a high surface area, designs have gravitated towards packed bed adiabatic absorbers, in which air and desiccant flows are given a large interfacial area to interact. The heat of phase change is not immediately removed, requiring that the desiccant flows at substantially higher flow rates, leading to a decline in the coefficient of performance (COP). In contrast, an internally cooled absorber can operate at an order of magnitude lower flow rate than its open, adiabatic counterparts, but requires a more complex design as three different fluids: air; absorbent; and a cooling medium are involved. Thus, the semi-open systems described herein are advantageous because they do not experience all of the disadvantages of fully open absorption and/or desorption systems, while at the same time allowing for a less segmented, more integrated system in which efficiencies in heat exchange and reuse of process streams is possible.

In some embodiments, an absorber can include polymer materials (e.g., for desiccant or water contact surfaces) or be constructed substantially or exclusively of polymers. Metals can be used in conjunction with polymers, although the effects of corrosion should be considered in the choice of a metal and the mode of construction as a semi-open system may expose the materials of construction to water, carbon dioxide, oxygen, and other potential corrosives.

Figures 4A, 4B:
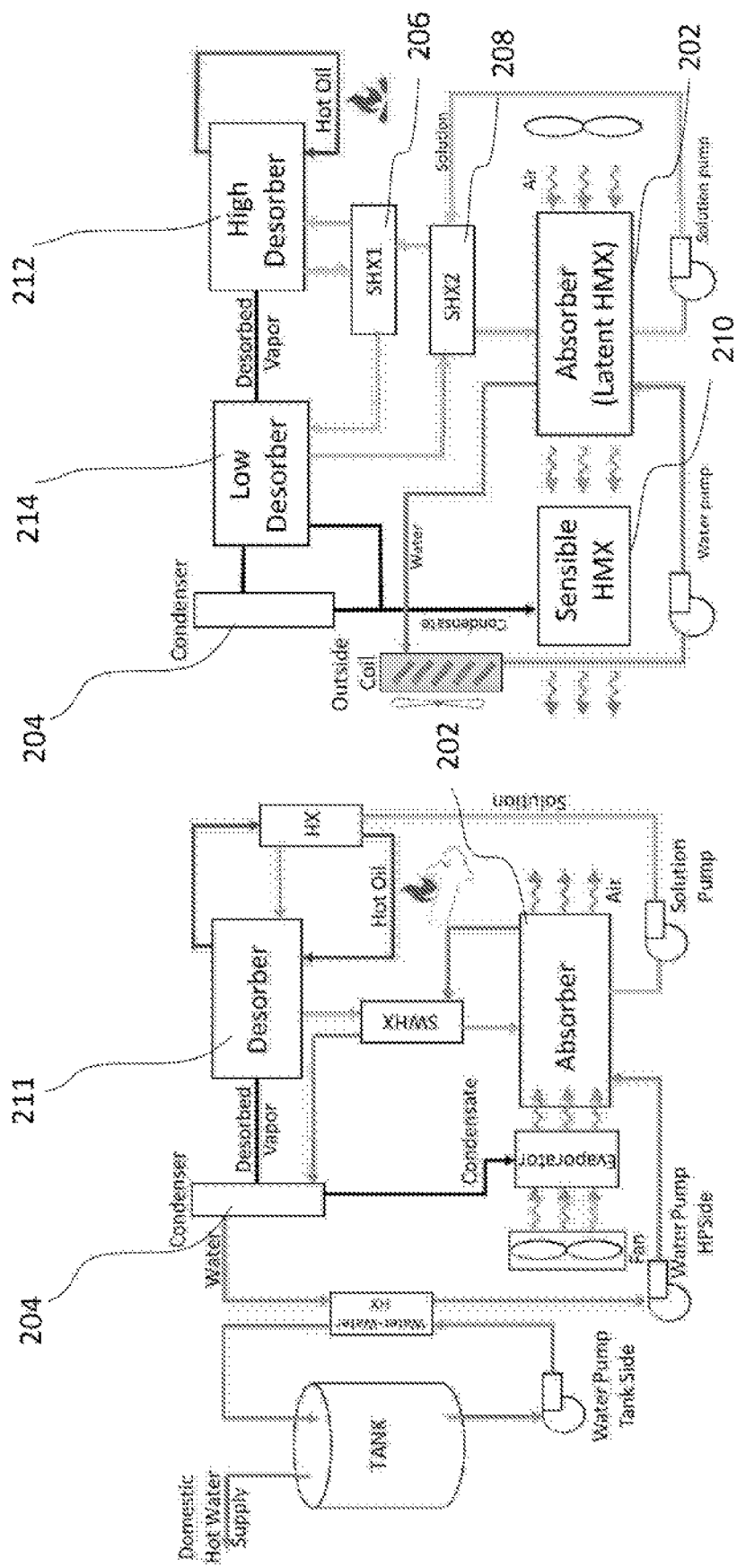
FIG. 4A shows a heat pump water heater system for residential use, according to an embodiment.
FIG. 4B shows an energy efficient, cost-effective separate sensible and latent cooling (SSLC) HVAC system implemented as a double-effect absorption cycle for residential use, according to an embodiment.

FIGS. 4A and 4B show a heat pump water heater (FIG. 4A) and a corresponding energy efficient, cost-effective separate sensible and latent cooling (SSLC) HVAC system implemented as a double-effect absorption cycle (FIG. 4b) for residential use. The system of FIG. 4B may provide approximately a 2.5 times energy efficiency at residential use scale increase compared to conventional liquid desiccant dehumidification and cooling systems at the same scale. This represents the first time an efficient and cost-effective implementation of the separate handling of sensible and latent loads, for example, at residential scale.

As shown in FIG. 4B, the air is first dehumidified (latent cooling) as it passes through the absorber 202. The condensate is then used to sensibly cool the air, through the use of an indirect evaporative cooler 210 (condensate is not returned to the process air stream). This results in the net decrease in the relative humidity and temperature of the process air stream. This ability to separately handle sensible and latent loads enables control of indoor humidity levels, improving IAQ. As an HFC-free, heat driven system, it provides for the reduction in peak electrical power consumption, and effectively resolves the use of global warming refrigerants in the HVAC industry.

In some embodiments, in order to implement this technology, it may be advantageous or even required to use compact, efficient heat and mass exchangers 206, 208 (SHX1 206, SHX2 208) for the desorbers 212, 214. According to some embodiments, a single-effect desorber 211 may be used for the water heating application (FIG. 4A) and a double-effect desorber 212, 214 may be used for the HVAC application (FIG. 4B). Although the desorber architecture is different for these two applications, the upper desorber in the double-effect cycle is similar with respect to flow types/rates to the single-effect desorber with the exception that, according to some embodiments, it functions at a higher temperature (about 200° C.) than the single-effect desorber (about 130° C.).

In some embodiments, the hot side module design can include an integrated desorbing, condensing surface, and a condensing heat exchanger. A vapor permeable membrane can be installed between the desorber and condenser sections to prevent the desiccant solution from exiting the desorber. To enhance the desorption rate, the desorbing surface can use a copper finned structure. In some embodiments, this finned structure can be brazed to the stainless-steel surface and nickel plated for corrosion prevention. The two sides, desorbing and condensing, can be bolted together with a gasket material to permit the module's disassembly if necessary during system testing. The desorbing surface can then be heated by hot oil. In some embodiments, the desorbing and condensing surfaces can be between about 0.1 $m^2$ and about 0.2 $m^2$, about 0.11 $m^2$ to about 0.15 $m^2$, or about 0.12 $m^2$ to about 0.13 $m^2$, inclusive of all values and ranges therebetween. In some embodiments, the desorbing and condensing surface can be about 0.122 $m^2$ and about 0.128 $m^2$, respectively. The interior dimensions (Height×Width×Depth) of the module can be between about 0.3 m×about 0.2 m×about 0.025 m and about 0.6 m×about 0.4 m×about 0.1 m, between about 0.35 m×about 0.25 m×about 0.05 m and about 0.5 m×about 0.35 m×about 0.075 m, or the like. In some embodiments, the interior dimensions (Height×Width×Depth) can be about 0.461 m×about 0.311 m×about 0.061 m. In some embodiments, the desorber portion of the module can have a thickness/depth of between about 0.01 m and about 1 m, about 0.015 m and about 0.9 m, about 0.02 m and about 0.8 m, about 0.025 m and about 0.7 m, about 0.03 m and about 0.6 m, about 0.01 m and about 0.9 m, about 0.01 m and about 0.8 m, about 0.01 m and about 0.7 m, about 0.01 m and about 0.6 m, about 0.01 m and about 0.5 m, about 0.01 m and about 0.4 m, about 0.01 m and about 0.3 m, about 0.01 m and about 0.2 m, about 0.2 m and about 1 m, about 0.3 m and about 1 m, about 0.4 m and about 1 m, about 0.5 m and about 1 m, about 0.6 m and about 1 m, about 0.7 m and about 1 m, about 0.8 m and about 1 m, or about 0.9 m and about 1 m, inclusive of all values and ranges therebetween. In some embodiments, the desorber portion of the module can have a thickness/depth of less than about 1 m, about 0.9 m, about 0.8 m, about 0.7 m, about 0.6 m, about 0.5 m, about 0.4 m, about 0.3 m, about 0.2 m, about 0.1 m, about 0.09 m, about 0.08 m, about 0.07 m, about 0.06 m, about 0.05 m, about 0.04 m, about 0.03 m, about 0.02 m, or about 0.01 m, inclusive of all values and ranges therebetween. In some embodiments, the desorber portion of the module can have a thickness/depth of greater than about 0.01 m, about 0.02 m, about 0.03 m, about 0.04 m, about 0.05 m, about 0.06 m, about 0.07 m, about 0.08 m, about 0.09 m, about 0.1 m, about 0.2 m, about 0.3 m, about 0.4 m, about 0.5 m, about 0.6 m, about 0.7 m, about 0.8 m, about 0.9 m, or about 1 m, inclusive of all values and ranges therebetween. In some embodiments, the desorber portion of the module can have a thickness/depth of about 0.034 m.

In other embodiments, the physical size of the desorber design can be reduced through the implementation of a multiple-plate design where the capacity is scalable through the addition of plates. In some embodiments, the design can include only an upper desorber or a lower desorber, while in other embodiments the design can include both an upper desorber and a lower desorber.

Figure 5A:
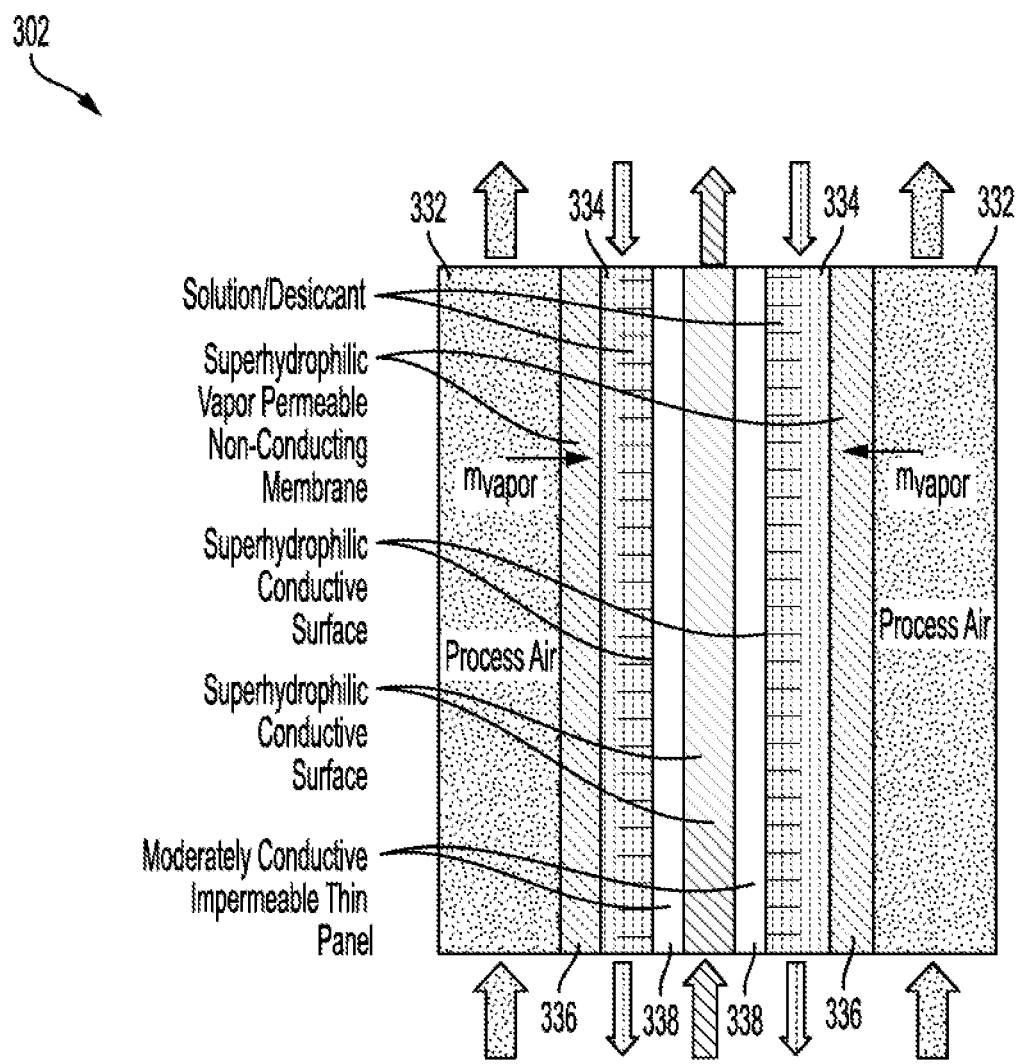
FIG. 5A shows a schematic of an element of an all polymer absorber for use in a double-effect LDDS, according to an embodiment.
Figure 5B:
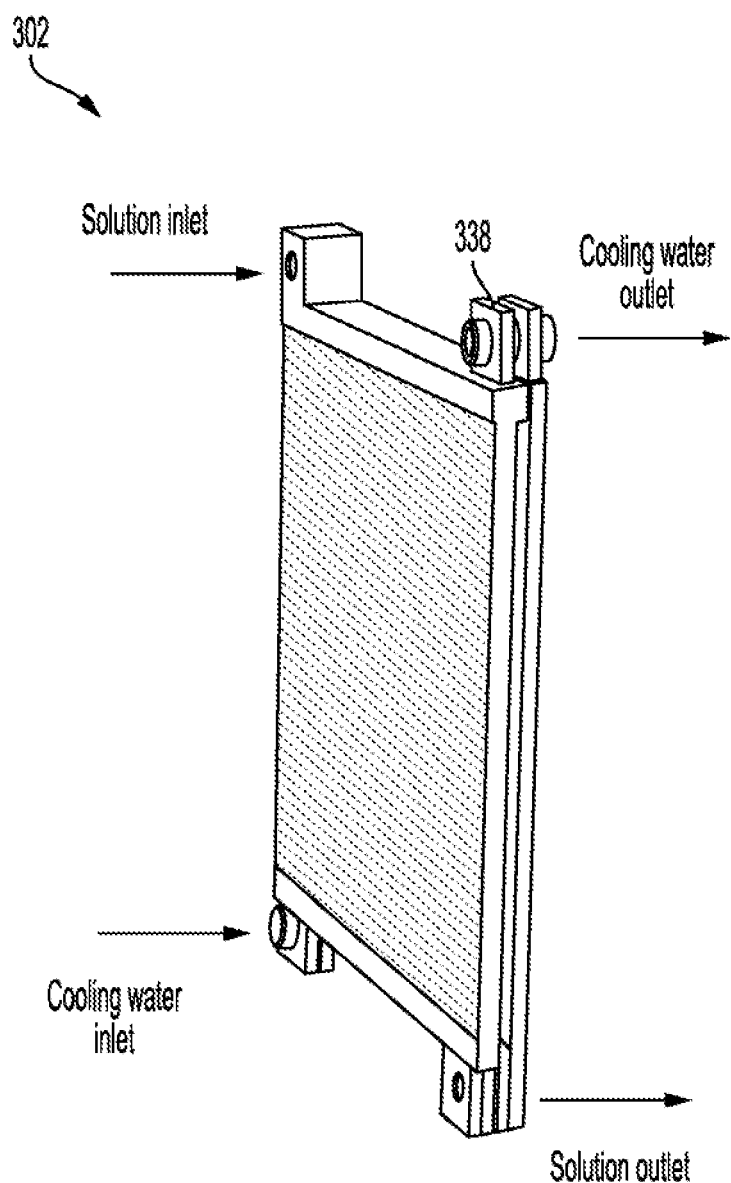
FIG. 5B shows a drawing of a four absorption surfaces polymer absorber coupling two elements into an absorber for use in a double-effect LDDS, according to an embodiment.
Figure 5C:
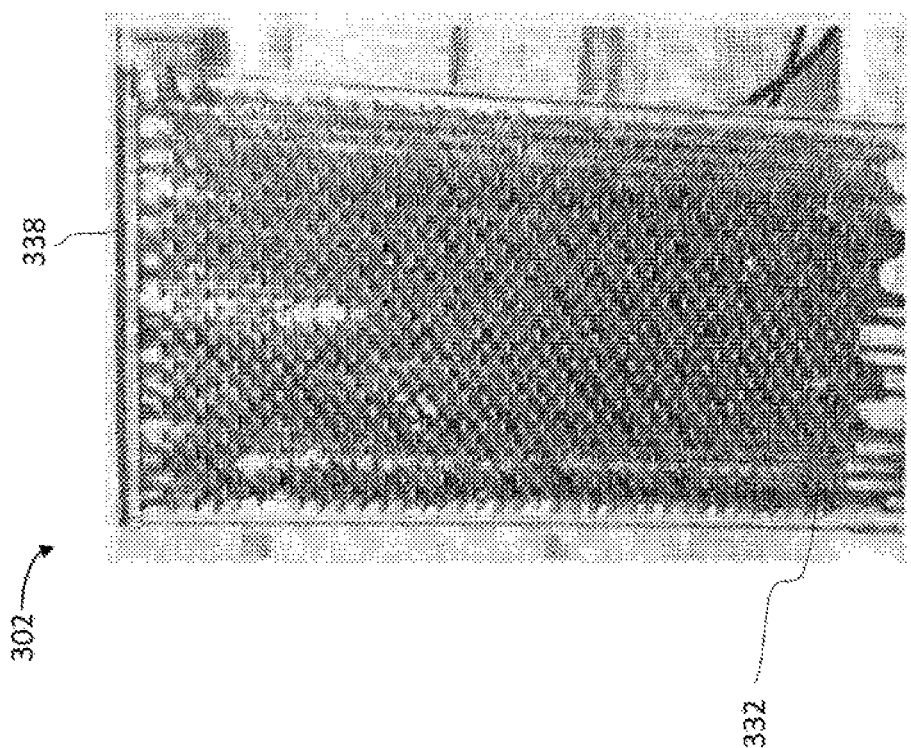
FIG. 5C shows a decorated spreading conductive surface for maintaining a thin Ionic Liquid (IL) solution film over the surface for effective absorption and heat transfer to the cooling medium for use in a double-effect LDDS, according to an embodiment.
Figure 5D:
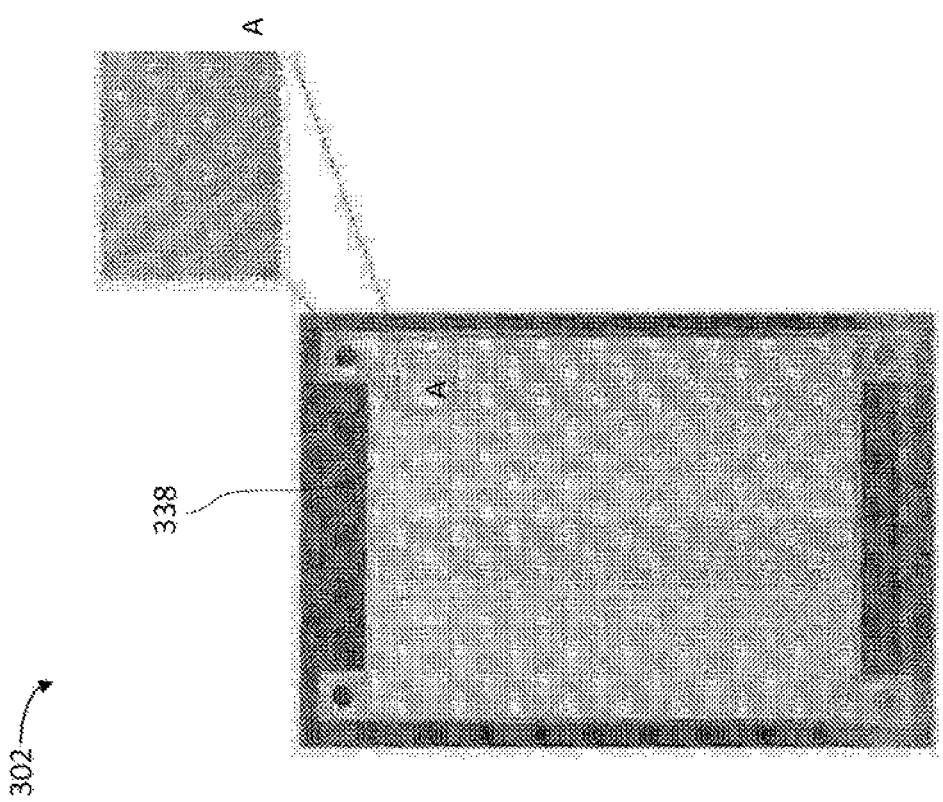
FIG. 5D shows a vapor permeable membrane for containing the IL solution film of the absorber for a double-effect LDDS, according to an embodiment.
Figure 6B:
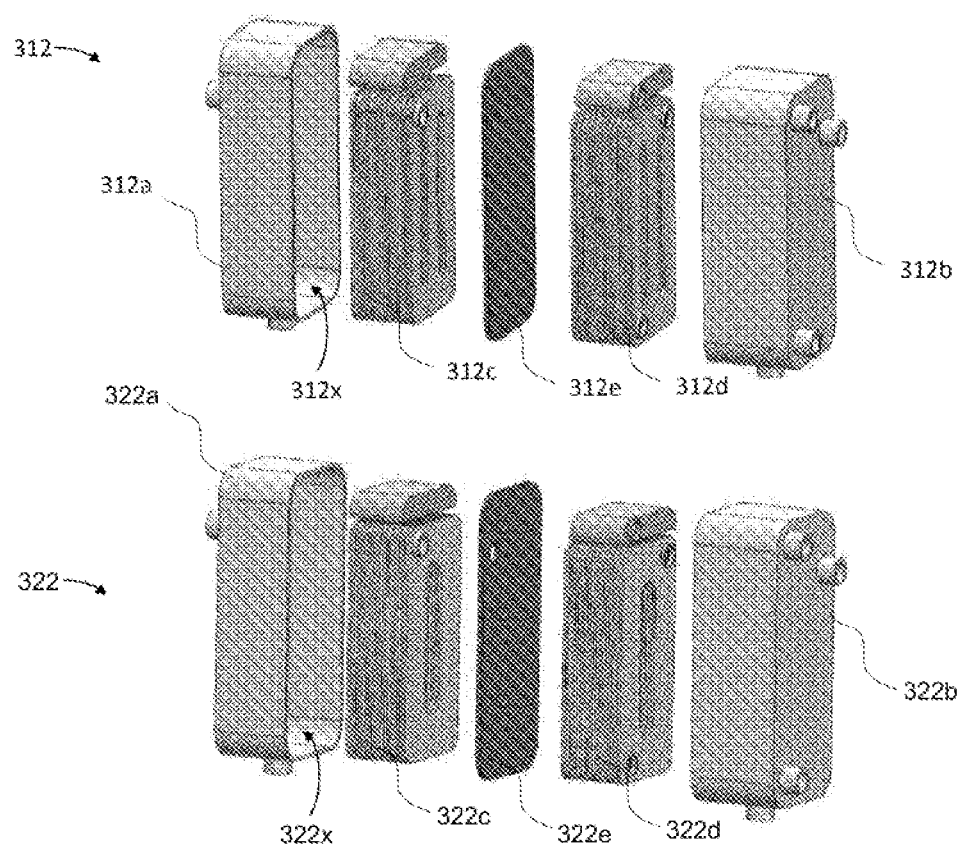
FIG. 6B shows an exploded view of the compact double desorber according to FIG. 6A.
Figure 6C:
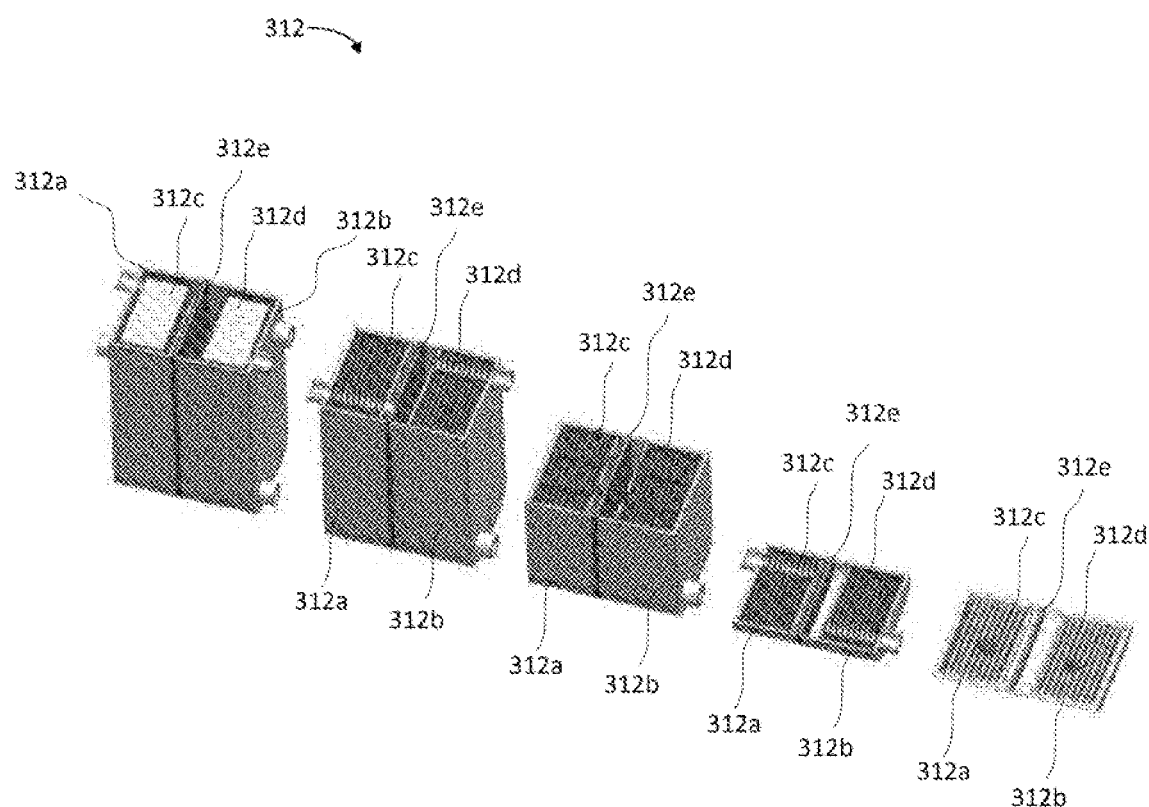
FIG. 6C shows horizontal cross-sections of the compact double desorber according to FIG. 6A.
Figure 6D:
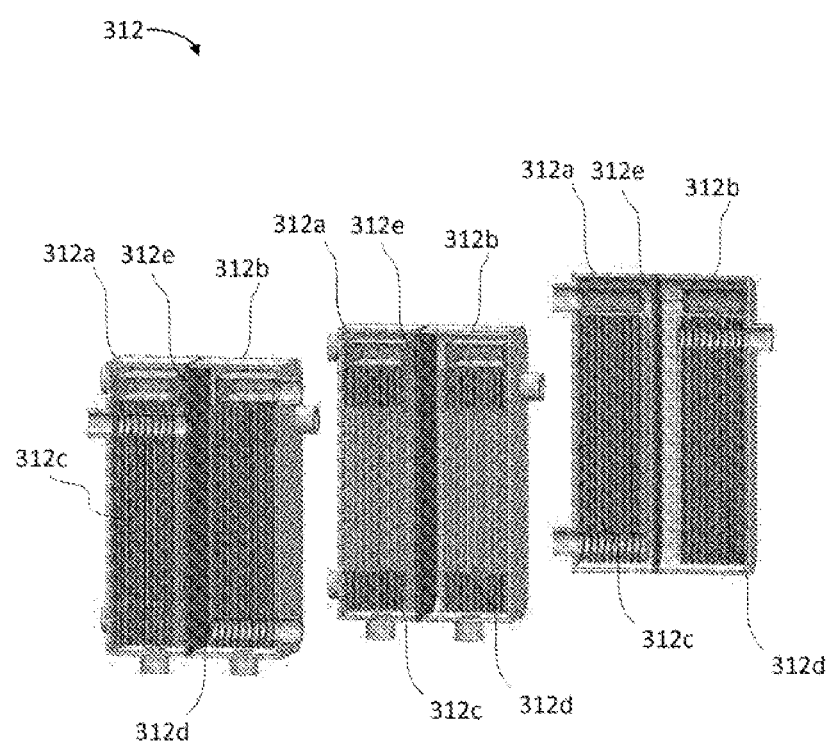
FIG. 6D shows vertical cross-sections of the compact double desorber according to FIG. 6A.

FIGS. 5A-5D show an absorber 302 that can be used in an LDDS (e.g., LDDS 10 or LDDS 20) and the results of using various surface treatment and bonding techniques. In some embodiments, a desiccant solution can be caused to flow (e.g., as a thin film, as discrete droplets, as a continuous flow, in discrete batches, or the like) on one or both sides of a cooling medium conduit 334 while constrained by a membrane 336 (e.g., a superhydrophobic membrane), as shown in FIG. 5A, such that process air 332 can flow past the desiccant solution, which can cause the absorption of water vapor from the process air 332 into the desiccant solution. The absorber of FIGS. 5A-5D can be modular, permitting plates 338 to be stacked, as shown in FIG. 5B to achieve a desired capacity. In some embodiments, the surface of the polymer can be hydrophilic, which, in conjunction with the surface structures, may result in spreading the desiccant solution as a thin film over some or all of the plates 338, as shown in FIG. 5C, unlike that of a hydrophobic surface, where in the absence of these features, the desiccant solution may form channels across the surface of the plate 338 rather than spreading over a greater portion or substantially all of the surface of the plate 338 when flowing down, up, or across the plate 338. In some embodiments, the membrane 336 can be bonded over the surface structures and edge structures. FIG. 5D shows one module from the absorber 302 comprising the plates 338. The plastic for an all plastic absorber 302, according to some embodiments, can be polycarbonate, polyacrylates, polyesters, polyimides, combinations thereof, or any other polymer materials. The surface of the polymer can be rendered hydrophilic by coating, inducing a surface reaction, disposing or defining surface features, or any other method suitable to form a hydrophilic surface of the polymer. The heat exchanging plates 338 for the flow of the desiccant solution (e.g., a working IL solution) can be decorated with an array of fins, e.g., a staggered array of rectangular fins, that may affect the flow pattern and resulting contact area between the fluid and the cooling surface, the substrate. A rivulet flow regime is exhibited by liquids falling over a flat vertical surface, as in the case of conventional heat exchanging plates. In contrast, the fins may allow the flow to be transformed into the continuous film regime when the wall is decorated with surface features, for example, as shown in box A of FIG. 5D. The absorber 302 can have an array of structures optimized to yield desired flow characteristics. In some embodiments, the fin elements of the array can be located sufficiently close to each other such that the desired flow effect is achieved but sufficiently far from each other to ensure that capillary forces do not dominate the flow. In other words, texture on the surface of a plate 338 can help increase flow continuity, but if surface features are positioned sufficiently close together such that the interstitial regions therebetween exert capillary forces on the desiccant solution, then at least some of the desiccant solution will become impregnated within the interstitial regions, resulting in discontinuous flow. In some embodiments, plate 338 surface decorations other than a staggered array of rectangular fins can be used.

In some embodiments, the water vapor can pass through the membrane 336 (e.g., a nanostructured membrane) and condense over a fin decorated surface of the plate 338, which can be cooled by the system's coolant. The membrane need not be porous if the nature of the material allows for a sufficiently rapid diffusion through the material under the normal conditions of use. For instance, the membrane may be one that remains saturated in the water, yet allows for active diffusion to the desiccant solution (e.g., working IL solution). The membrane 336 can be comprised of fibrous polymers. Polymers that can be used include polyamides, polyethers, polyimides, polyesters or other polymers that interact with but do not dissolve in water. The membrane 336 can provide a surface that is extremely porous to allow rapid water exchange over a rough membrane that has a very high area surface.

In some embodiments, the desiccant solution can comprise one or more ILs, which exhibit favorable crystallization and corrosion characteristics with regard to the LDDS 10, the LDDS 20, and other systems and apparatuses described herein. Conventional absorbents, such as lithium bromide, lithium chloride, calcium chloride and similar brines, often can be used in only limited operating parameter ranges, such as a narrow range of temperature, pressure, and the like, mainly due to crystallization of the same during use, which requires control equipment to monitor and rapidly/constantly adjust the system working conditions to avoid crystallization of such absorbents, even in case of power outages. The prohibitively high cost of such control systems and the monitoring and dynamic process control systems necessary for such conventional systems and absorbents can make their implementation for many applications and conditions impossible, e.g., for small scales systems.

FIGS. 6A-6D show a desorber 312 that can be used in an LDDS (e.g., LDDS 10 or LDDS 20). In some embodiments, the desorber 312 can be configured to heat the dilute solution in order to cause a phase change of water in the dilute solution to water vapor that can be desorbed. In some embodiments, the first desorber 312 can include a plurality of desorption plates configured to facilitate desorption when the water vapor and desiccant solution comes into contact with the plates, increasing the concentration of desiccant in the dilute solution to form an intermediate solution. In some embodiments, the heat of desorption/condensation can be captured by a heat exchanger. In some embodiments, at least a portion of the intermediate solution can then be communicated to a second desorber 322 such that at least a portion of the remaining water in the intermediate solution is desorbed, forming a concentrated solution. In some embodiments, the heat of desorption/condensation at the first desorber 312 can be used to heat the intermediate solution for regeneration at the second desorber 322. Once the concentrated solution is formed at the second desorber 322 it has been fully or substantially fully regenerated for subsequent desiccation purposes by an absorber (e.g., absorber 102, 202, 302). The desorbed water vapor from the second desorber 322 can be communicated to a condenser such that the water vapor can be condensed to make-up water, can be used to heat various processes and streams elsewhere in the process, and/or can be disposed to waste.

As illustrated in FIGS. 6A-6D, the first desorber 312 can include a first housing portion 312a dimensioned and configured to be removably coupled to a second housing portion 312b to form a housing of the first desorber 312. In some embodiments, the first desorber 312 can include a plurality of apertures through at least one of the first housing portion 312a or the second housing portion 312b, the plurality of apertures defining a plurality of inlet and outlet ports for process streams, e.g., the desiccant solution, the water vapor, the water, and/or a heat exchange medium (e.g., oil, steam, flue gas). In some embodiments, a first solution inlet port 313a and a first solution outlet port 313b can be defined by apertures through the housing portion 312a, e.g., at a top of the first desorber 312 and at a bottom of the first desorber 312, respectively. In some embodiments, a vapor outlet port 313c can be defined by an aperture through the first housing portion 312a of the first desorber 312, e.g., at or near the top of the first desorber 312. In some embodiments, a water outlet port 313d can be defined by an aperture through the first housing portion 312a of the first desorber 312, e.g., at or near the bottom of the first desorber 312. In some embodiments, the first desorber 312 and the second desorber 322 may be substantially similar. For instance, in some embodiments, the second desorber 322 may comprise a first housing portion 322a and a second housing portion 322b. In some embodiments, the second desorber 322 can further comprise a second solution inlet port 323e. In some embodiments, the second solution inlet port 323e can be defined by an aperture in the second housing portion 322b of the second desorber 322 e.g., positioned at or near the top of the second desorber 322. In some embodiments, a second solution outlet port 323f can be defined by an aperture through the second housing portion 322b of the second desorber 322 e.g., at or near the bottom of the second desorber 322. In some embodiments, a heat exchange medium (oil) inlet port 323g can be defined by an aperture through the second housing portion 322b of the second desorber 322 e.g., positioned at or near the bottom of the second desorber 322. In some embodiments, a heat exchange medium (oil) outlet port 323h can be defined by an aperture through the second housing portion 322b of the second desorber 322 e.g., positioned at or near the top of the second desorber 322.

In some embodiments, two or more of the apertures can define, at least in part, a fluid flow path through the first desorber 312 or the second desorber 322. In some embodiments, a fluid flow path can be defined between the first solution inlet port 313a and the first solution outlet port 313b of the first desorber 312 and can include a plurality of desorption plates/diffusion plates stacked in an inner volume of the first housing portion 312a of the first desorber 312. In some embodiments, a fluid flow path can be defined between the first solution inlet port 313a and the second solution outlet port 323f of the second desorber 322 and can include a plurality of desorption plates/diffusion plates stacked in an inner volume of the first housing portion 322a of the second desorber 322. In some embodiments, one or more of the first or second desorber 312, 322 can be heated by heated oil, flue gas, steam, or another such heated fluid. In some embodiments, a fluid flow path can be defined between the first solution inlet port 313a and the vapor and water outlet ports 313c and 313d in which a volume of water in the dilute desiccant solution is charged into the first desorber 312 through the first solution inlet port 313a, a portion of the volume of water desorbs/diffuses out of the dilute desiccant solution, a first sub-portion of the portion of the volume of water exits the first desorber 312 through the vapor outlet port 313c, and a second sub-portion of the portion of the volume of water exits the first desorber 312 through the water outlet port 313d. Other fluid flow paths can include between the heat exchange medium inlet port 323g and the heat exchange medium outlet port 323h of the second desorber 322. In some embodiments, heated oil and/or other heating media can be used to heat the first desorber 312. In some embodiments, if the second desorber 322 (low desorber) has a heat recovery exchanger (e.g., condenser 104 shown in FIG. 2), as mentioned earlier for heating water or air for a separate process or subprocess, all or some of the vapor desorbed from the working solution in the second desorber 322 may be condensed.

In some embodiments, the first housing portion 312a and/or the second housing portion 312b can at least partially define an inner volume 312x configured to contain or partially contain a first plurality of plates 312c and/or a second plurality of plates 312d. In some embodiments, the shell can include or be formed from any suitably durable material without limitation. In some embodiments, the plurality of plates can be stacked or joined together and disposed within the inner volume 312x of the shell of the first desorber 312. In some embodiments, a separator plate 312e can be disposed between the two stacks of plates 312c, 312d. In some embodiments, a dilute solution comprising desiccant and water can be communicated into the desorber 312 through the first solution inlet port 313a, along a solution flow path through the first desorber 312, and out the first solution outlet port 313b.

In some embodiments, a heat exchange medium can be communicated into the heat exchange medium inlet port 323g, through a heat exchange medium flow path through the second desorber 322 and out the heat exchange medium outlet port 323h. In some embodiments, communicating the heat exchange medium through the first desorber 312 or the second desorber 322 can heat the desiccant solution comprising desiccant and water such that the water in solution is converted to water vapor and is communicated out of the first desorber 312 or the second desorber 322 via the water vapor outlet port. In some embodiments, the desiccant solution can heat the heat exchange medium in the first desorber 312 or the second desorber 322 such that the heat exchange medium leaving the first desorber 312 or the second desorber 322 can exchange heat elsewhere in the process. In some embodiments, the first desorber 312 or the second desorber 322 can be configured such that the heat exchange medium and the desiccant solution comprising desiccant and water are fluidically isolated each from the other. In some embodiments, the first desorber 312 can be configured such that the heat exchange medium is communicated along a heat exchange medium flow path through the stacked plates 312c on a second side of the separator plate 312e while the desiccant solution comprising desiccant and water is communicated along a desiccant solution flow path through the stacked plates on a first side of the separator 312e. Design fluid temperatures, according to one embodiment, are provided in Table 1.

TABLE 1

Multi-plate Desorber Fluid Temperatures

Double-Effect Configuration

| Upper Desorber | | Hot Side (Oil) | Cold Side (IL) | Vapor |
|---|---|---|---|---|
| Inlet Temperature | (° C.) | 180 | 140 | NA |
| Outlet Temperature | (° C.) | 165 | 160 | 145 |

| Lower Desorber | | Hot Side (Vapor*) | Cold Side (IL) | Vapor |
|---|---|---|---|---|
| Inlet Temperature | (° C.) | 145 | 74 | NA |
| Outlet Temperature | (° C.) | 45 | 80 | 75 |

Single-Effect Configuration

| | | Hot Side (Oil) | Cold Side (IL) | Vapor |
|---|---|---|---|---|
| Inlet Temperature | (° C.) | 155 | 98 | NA |
| Outlet Temperature | (° C.) | 146 | 120 | 120 |

*Note: Fluid enters as vapor from upper desorber and exits as condensate.

This extra temperature window enables air-cooling of the absorber in hot climates. In some embodiments, the IL can include one or more of Evonik CrysCo Plus 2200, Evonik CrysCo Plus 2630, piSorb 275, Sorbionic4, imidazolium-containing materials, 1-butyl-3-methylimidazolium bis(trifluoromethylsulfonyl)imide, 1-ethyl-3-methylimidazolium, 1-ethyl-3-methylimidazolium bis (trifluoromethyl-sulfonyl) amide, tetra-nbutylphosphonium trifluoromethanesulfonyl leucine, N-alkyl-N,N-dimethylhydroxyethylammoniumbis(trifluoromethane) sulfonylimidelithium bromide, lithium chloride, calcium chloride, combinations thereof, or the like. In some embodiments, the IL can include one or more of: imidazolium-containing materials, 1-butyl-3-methylimidazolium bis(trifluoromethyl sulfonyl)imide, 1-ethyl-3-methylimidazolium bis (trifluoromethyl-sulfonyl)amide, tetra-nbutylphosphonium trifluoromethanesulfonyl leucine, N-alkyl-N,N-dimethylhydroxyethylammoniumbis(trifluoromethane) sulfonylimide, combinations thereof, or the like. Regardless of the specific IL used, the value of a non-crystallizable desiccant includes many of the specific benefits outlined herein.

Figure 7:
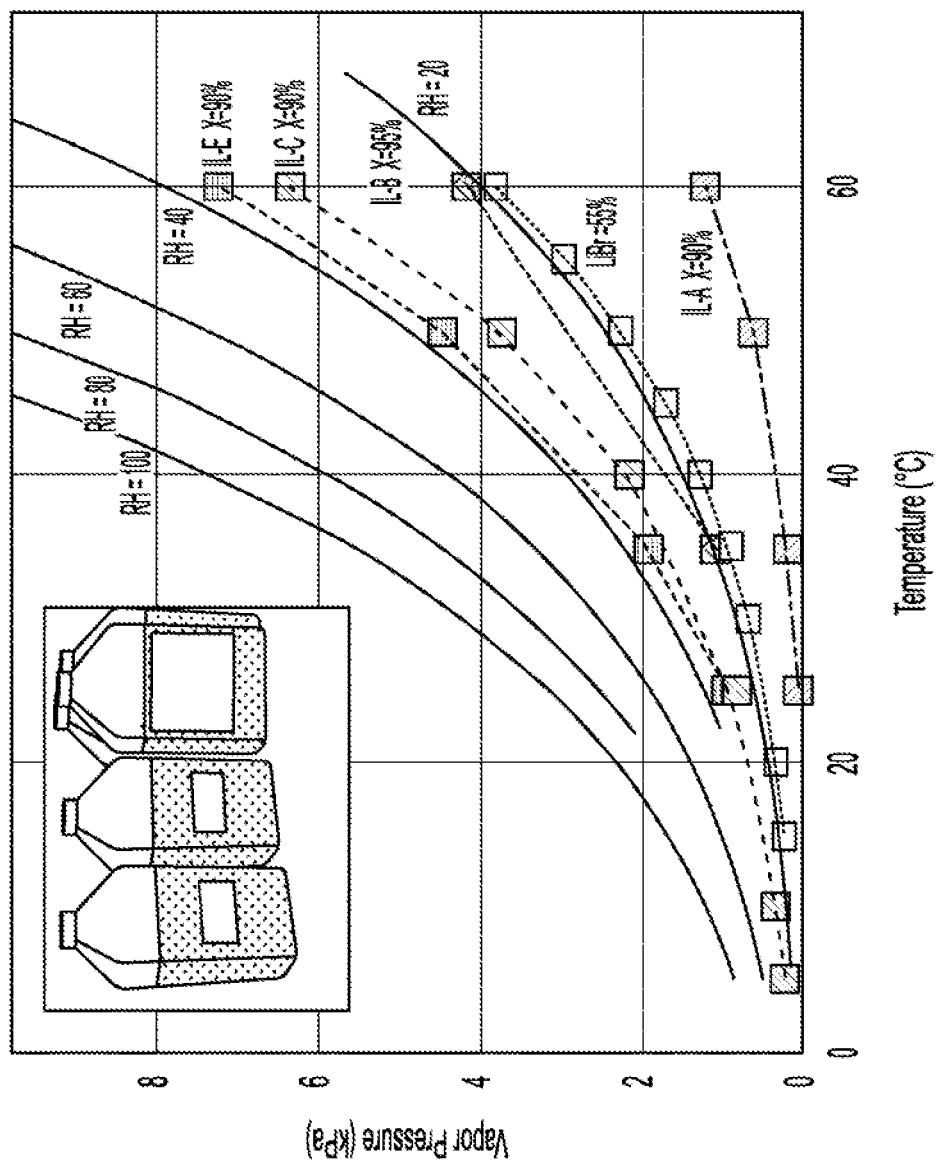
FIG. 7 shows a plot of the vapor pressure of solutions for absorption of water for use in LDDS systems, for various IL solutions and conventional LiBr solution at various concentrations.

Without wishing to be bound by any particular theory, a key factor that may limit the operation and application of existing LiBr systems is the need for cooling the absorber using a wet cooling tower or another cooling cycle. The need for a wet cooling tower has limited the use of LiBr systems to large scales. Development efforts have been primarily focused on building larger heat exchangers, hybridization with vapor compression cycles, and to some extent using additives to delay LiBr crystallization. The fundamental physical barrier in building an air-cooled LiBr system is that the high vapor pressure of the LiBr solution at temperatures in excess of 30° C. inhibits water vapor absorption from the evaporator in a closed cycle or the humid air in an open cycle. FIG. 7 compares the vapor pressure of four example ILs, where IL-A is Evonik CrysCo Plus 2200, IL-B is Evonik CrysCo Plus 2630, IL-C is piSorb 275, and IL-E is Sorbionic4 with that of the LiBr solution. A significant vapor pressure depression is observed in the case of IL-A. The vapor pressure of IL-A at 50° C. is approximately equal to that of the LiBr solution at 30° C.

Figure 8:
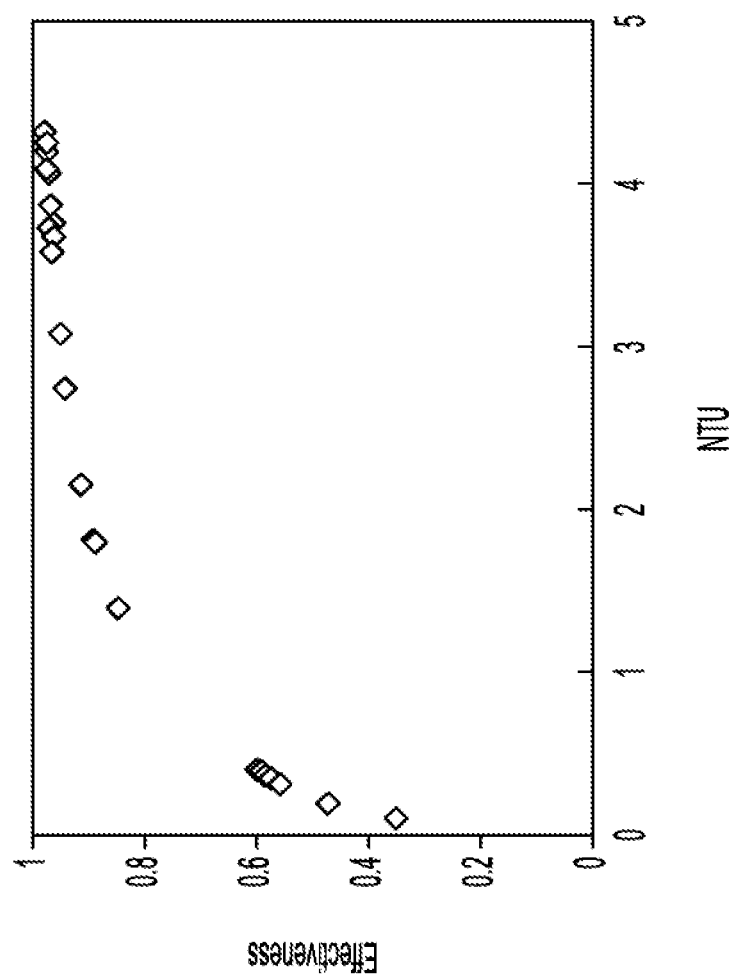
FIG. 8 shows a plot of effectiveness vs. the number of transfer units (NTU) for a plate heat exchanger that can be used in the double-effect LDDS, according to an embodiment.

Solution heat exchangers substantially impact the cycle's COP because they are responsible for recovery of the heat added to the desiccant in the desorber. To deal with a higher viscosity displayed by IL solutions, the flow cross-section is increased, where proper choice of the geometrical parameters, such as width, length, number of flow paths, and flow cross-section area, and proper choice of the flow rate and temperature, an effectiveness of more than 0.95 can be achieved with compact low-cost plate-and-frame heat exchanger, as shown in FIG. 8.

Figure 9:
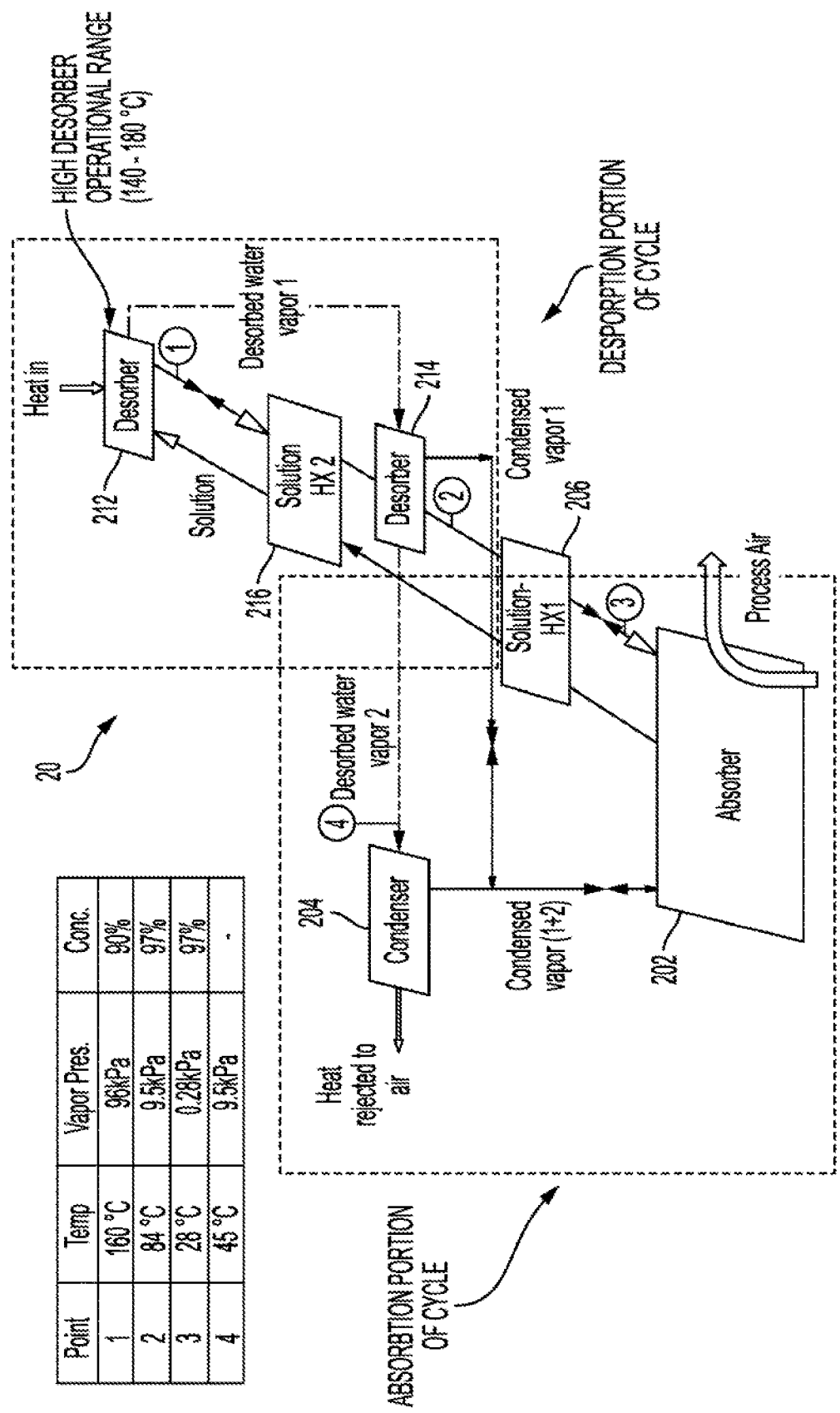
FIG. 9 shows a schematic for a double-effect LDDS, according to an embodiment.
Figure 10B:
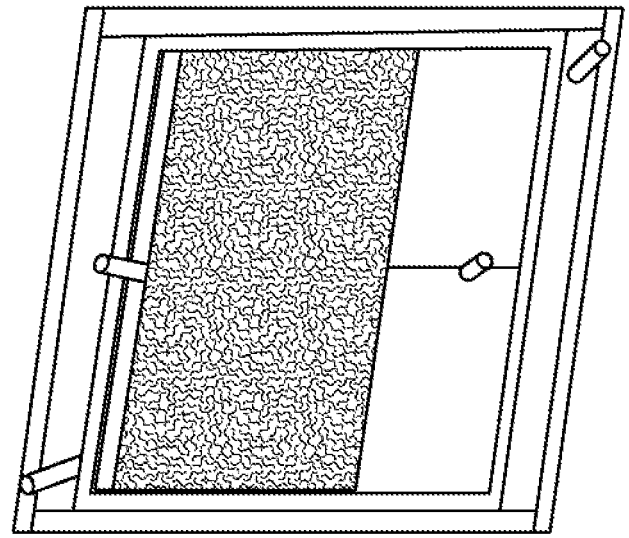
FIG. 10 show a schematic (L) and a photograph (R) for a high desorber for use in a double-effect LDDS, according to an embodiment.
Figure 10A:
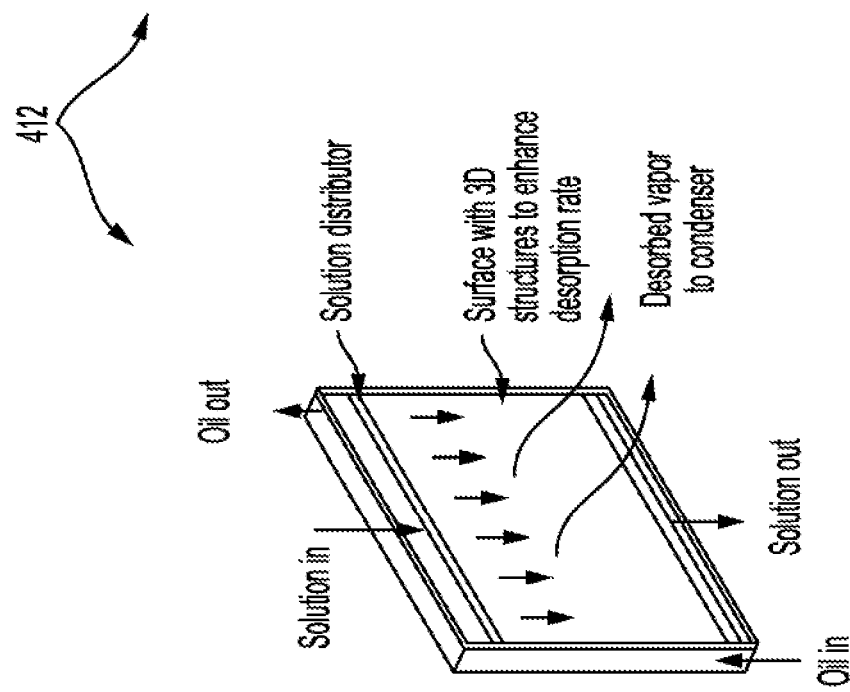

The system's operating conditions are constructed to address the median 1% design air temperature of 32° C. for the US. In some embodiments, for example when the desiccant solution comprises IL-C, this may necessitate operation of the condenser at about 45° C. to provide sufficient thermal potential to reject heat to air even at high ambient temperatures. To provide the ability to regenerate IL-C such that it produces the condenser saturation vapor temperature of 45° C., the lower desorber solution exit concentration and temperature are 97% and 84° C., respectively. The upper desorber exit concentration and temperature are 92% and 160° C., respectively. These operating conditions result in the desiccant solution entering the absorber at a concentration and temperature of 97% and 28° C., respectively. This corresponds to a vapor pressure of 0.28 kPa, providing substantially greater absorption (dehumidification) potential than LiBr or LiCl at similar operating conditions. These data, related to the process state points presented on FIG. 3 for the complete system and in FIG. 9 for the absorber-double desorber portion of the system, are provided in Table 2 and reproduced in FIG. 9. Element numbering from FIG. 3 is re-created in FIG. 9 to identify the elements of the LDDS system of FIG. 9, however this is not intended to define or limit the operational parameters, configuration, or process steps to those described above with respect to the LDDS 20 in FIG. 3.

TABLE 2

System Operational Parameters.

| Point | Temp (° C.) | Vapor Pres. (kPa) | Conc. (%) |
|---|---|---|---|
| 1 | 160 | 96 | 92 |
| 2 | 84 | 9.5 | 97 |
| 3 | 28 | 0.28 | 97 |
| 4 | 45* | 9.5 | — |

*Note: Vapor Saturation Temperature

For at least some of the embodiments described herein and embodiments not explicitly included herein but understood by one of skill in the art to be included in the scope of the claimed invention, the double-effect configuration provides nearly twice the efficiency of a single-effect system. In some embodiments, the system is further enhanced in efficiency by physical separation of the desorber and condenser heat exchangers. In some configurations and embodiments, ambient air can be introduced into a plastic steam-air heat exchanger and the desiccant solution can be regenerated in an extremely compact steam-solution heat exchanger. This regeneration approach results in a latent effectiveness approaching 100% and an estimated cycle COP of about 1.8 based on the amount of latent heat it handles and the heat input. Approximating parasitic losses of about 5% and a gas burner efficiency of about 87%, a primary COP of about 1.5 is calculated for the system. The application of these systems for DOAS, desiccant-based cooling, and handling latent heat loads in buildings, has the potential to provide significant energy savings.

Figure 11:
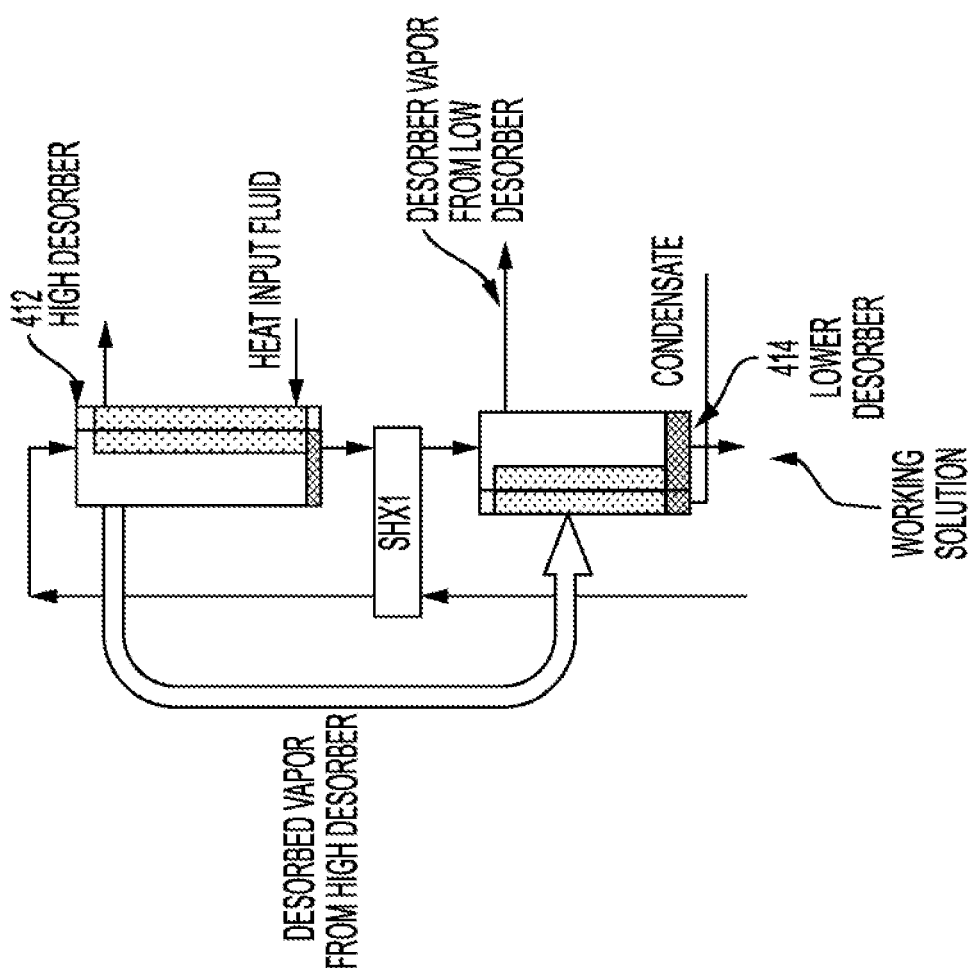
FIG. 11 shows a schematic for a configuration of the high and low desorbers of a double-effect LDDS, according to an embodiment.

FIG. 11 illustrates a high desorber 412 for a double-effect system comprising a low desorber and the high desorber 412, e.g., corresponding generally in function to the second desorber 214 and the first desorber 212, respectively. The high desorber 412 can include a heat input (not shown), for example but not limited to, using heating oil, to transfer heat to the desiccant solution. The low desorber can use the condensing water vapor to transfer heat to a desiccant solution (e.g., desiccant solution). As shown in FIG. 11 the high desorber is configured such that the desiccant solution (e.g., desiccant solution) can be transported across a fin decorated surface of the plate (e.g., plate 338), the fin decoration characteristics, surface chemistry, and other parameters configured to maximize a desorption rate of water from the process air (e.g., 332) into the desiccant solution. As shown in FIG. 11 the high desorber 412 can be configured such that the heat exchange medium flowing on a back surface of the plate opposite the desiccant solution on the fin decorated surface. The desorbed water vapor is directed to the lower desorber where it condenses and transfers its latent heat to the desiccant solution.

In some embodiments, the high desorber 412 and the low desorber 414 can be configured, as shown in FIG. 11 such that the desiccant solution (e.g., a working IL solution) is heated by an external heat source for the high desorber 412 and is transmitted through a heat exchanger SHX1, e.g., a high heat exchanger, where the hot concentrated desiccant solution (working solution) from the high desorber 412 transfers heat to the dilute desiccant solution feeding the high desorber 412. The desorbed vapor driven from the concentrated desiccant solution (working solution) in the high desorber 412 condenses in a condenser in the lower desorber 414 to transfer its heat of condensation to the concentrated desiccant solution from the high desorber 412 in the low desorber 414 for further concentration of the concentrated desiccant solution with the condensed water from the lower desorber 414 exiting the system.

Figure 12:
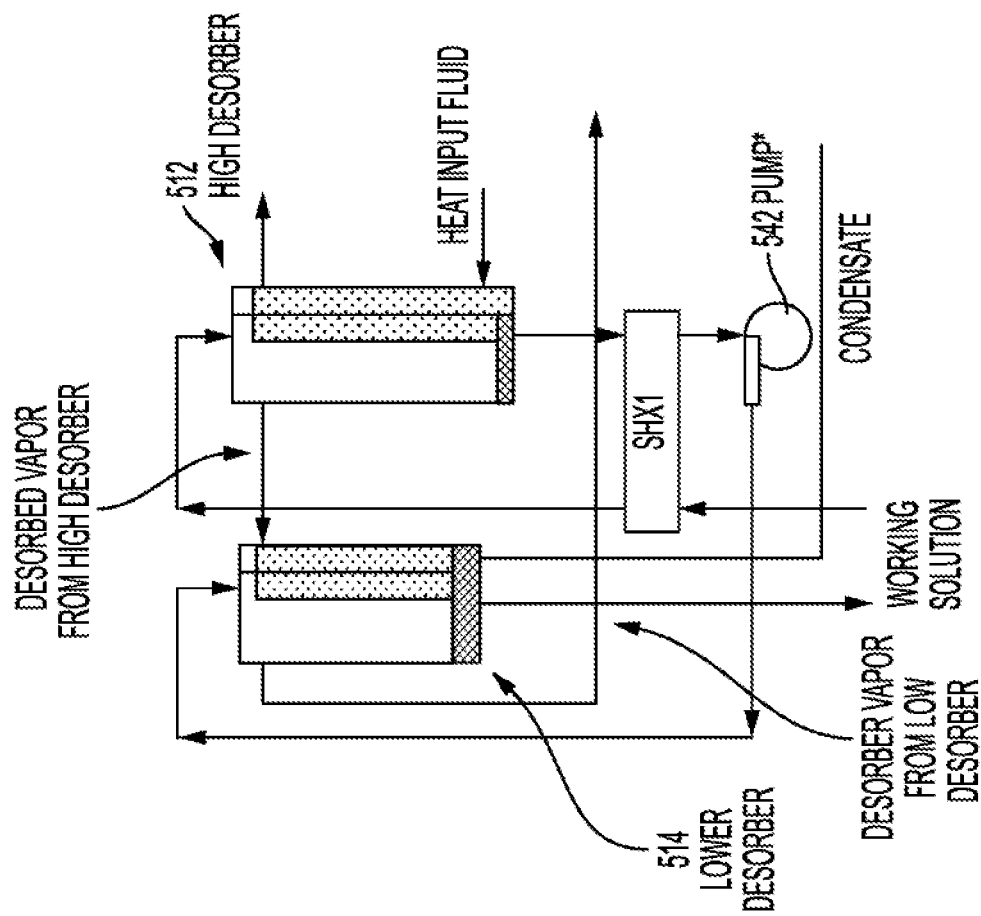
FIG. 12 shows a schematic for a configuration of the high and low desorbers of a double-effect LDDS, according to an embodiment.
Figure 13:
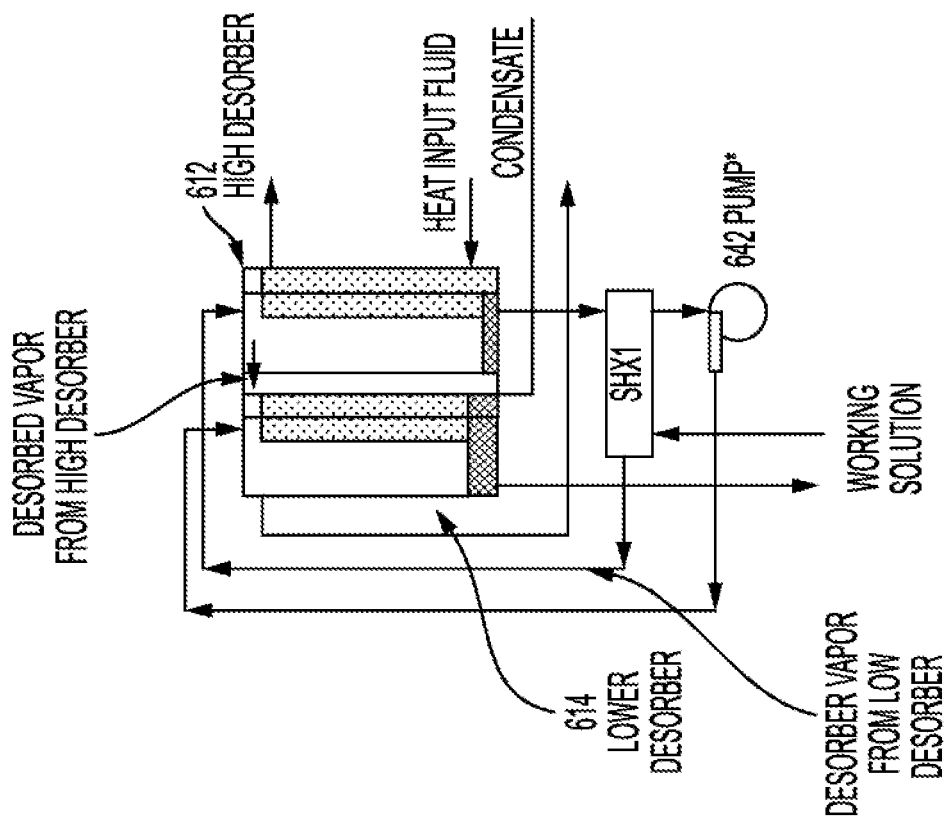
FIG. 13 shows a schematic for a configuration of the high and low desorbers of a double-effect LDDS, according to an embodiment.

Although illustrated in FIG. 11 such that the high desorber 412 is situated above the low desorber 414, this is not required, as is illustrated in FIGS. 12 and 13, where the high desorber 512, 612 and low desorber 514, 614 are adjacent to each other, differing in the manner in which the high desorber 512, 612 is connected to the low desorber 514, 614. In some embodiments, a conduit can be employed to deliver the desorbed water vapor to the condenser of the lower desorber 514, as illustrated in FIG. 12. In some embodiments, the high desorber 612 and low desorber 614 can effectively be combined into a single unit where the desorbed vapor from the high desorber portion 612 is directly delivered to the condenser of the low desorber portion 614, as illustrated in FIG. 13. A pump 542, 642 is shown beyond the concentrated desiccant solution of the high heat exchanger SHX1, but this pump may be situated elsewhere in the system with respect to the high desorber 512, 612 and the low desorber 514, 614. Alternatively the pump 542, 642 can be a redundant pump in terms of the transport of the concentrated desiccant solution.

Figure 14:
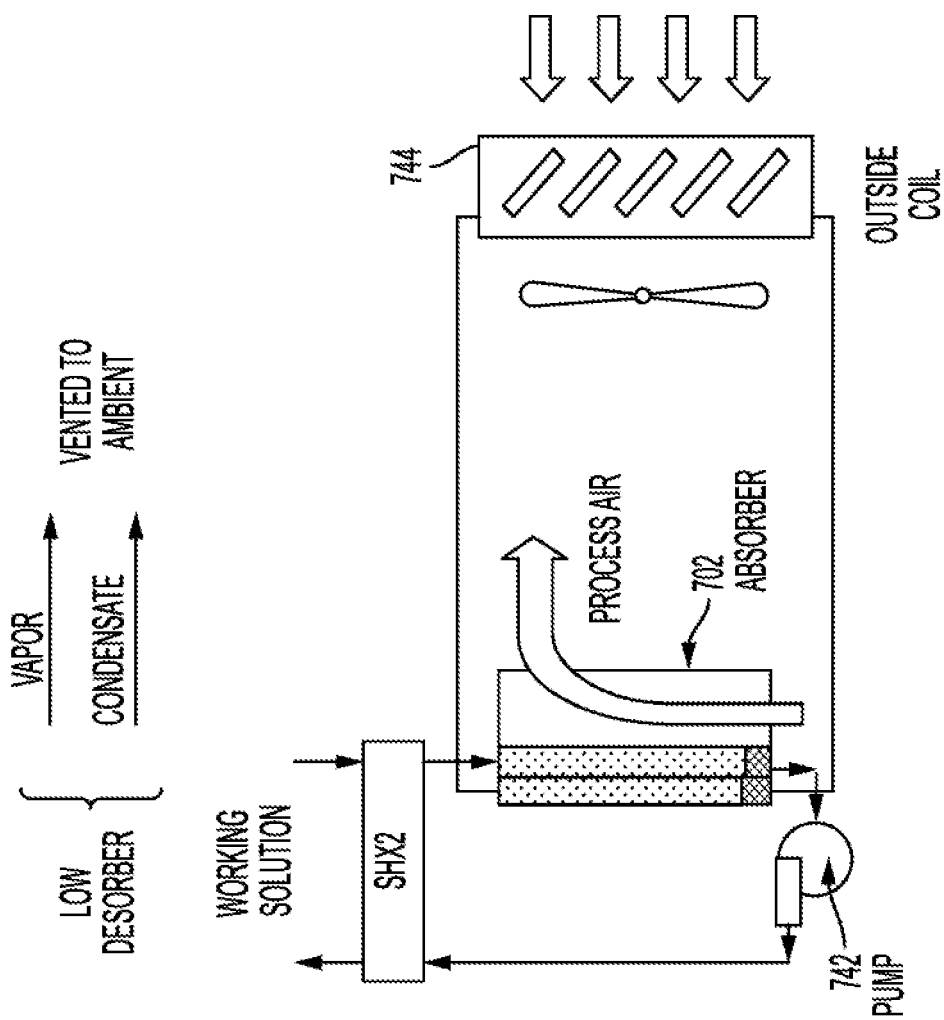
FIG. 14 shows a schematic for a configuration of the absorber and its cooling using ambient conditions of a double-effect LDDS, according to an embodiment.
Figure 15:
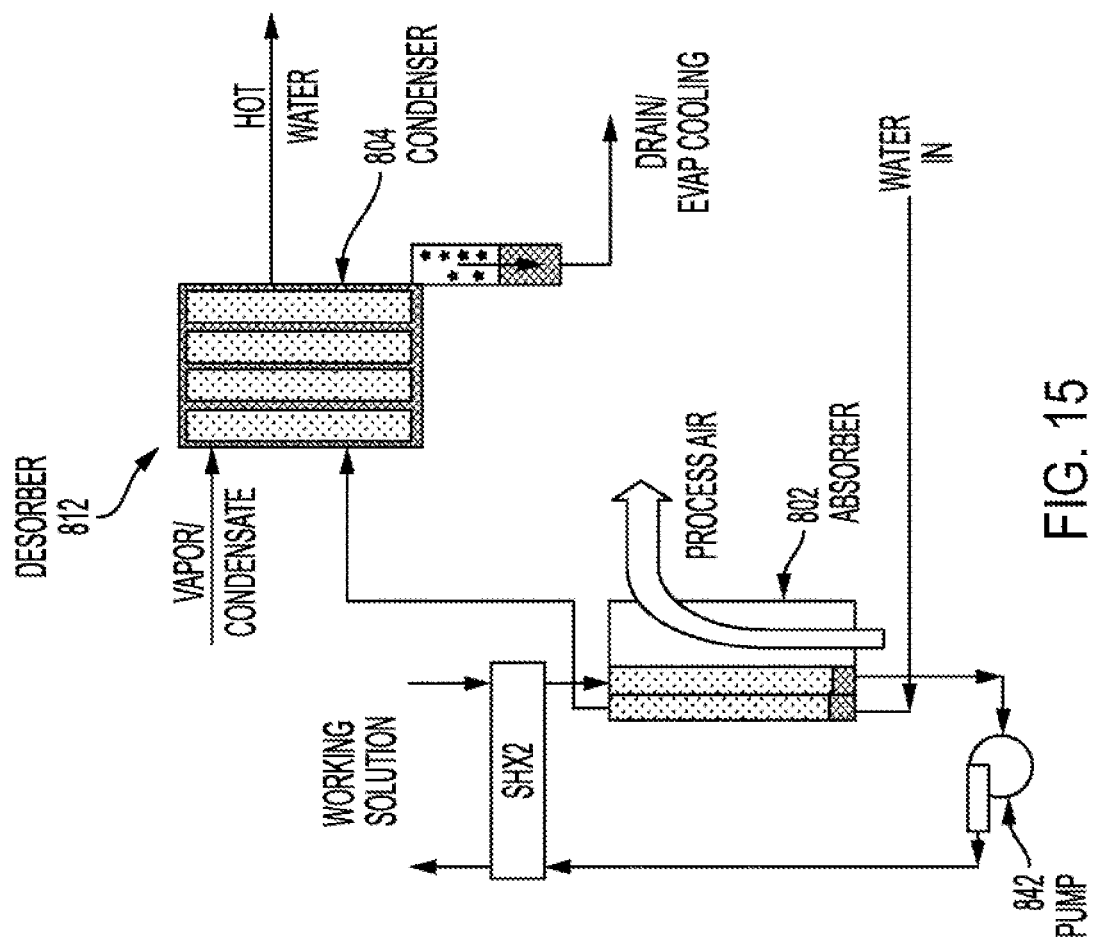
FIG. 15 shows a schematic for a configuration of the absorber and utilization of recovered water products from the low desorber of a double-effect LDDS, according to an embodiment.
Figure 16:
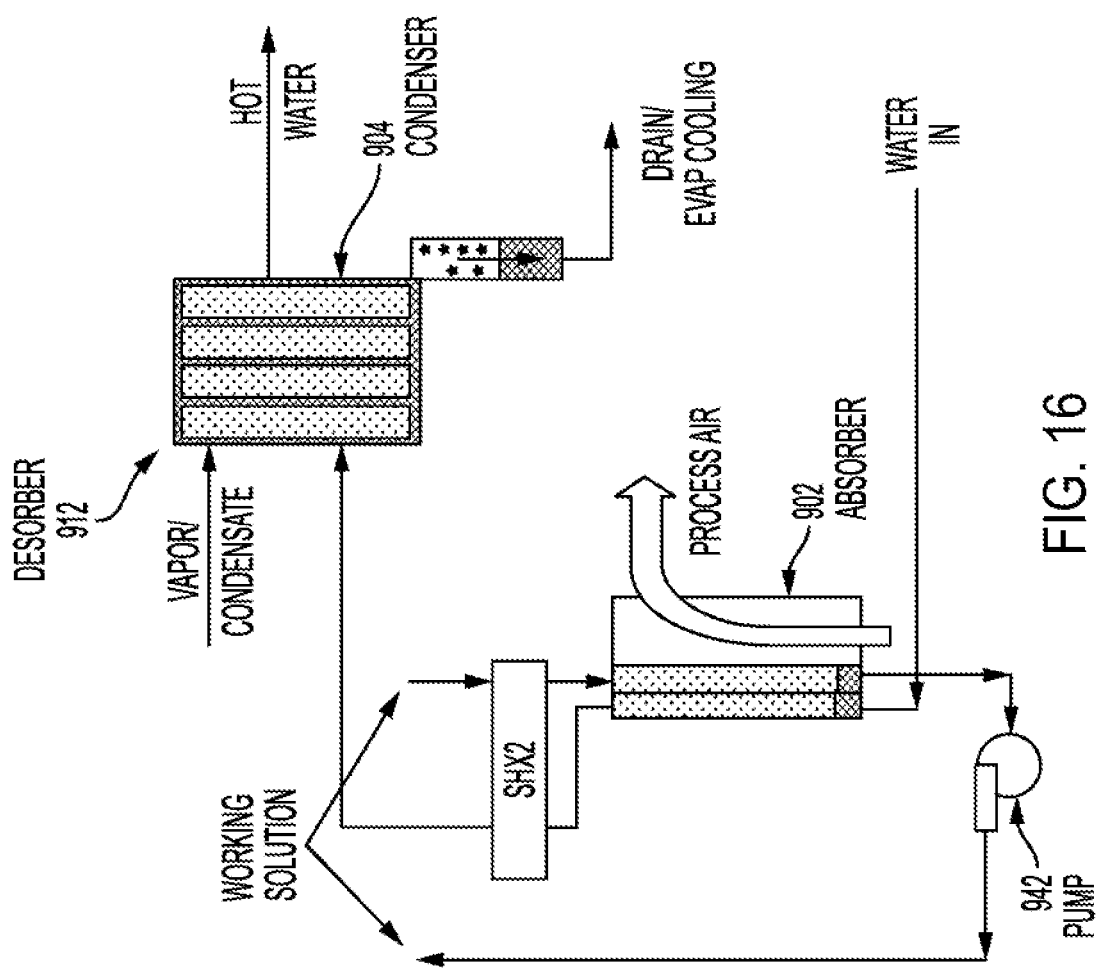
FIG. 16 shows a schematic for a configuration of the absorber and utilization of recovered water products from the low desorber of a double-effect LDDS, according to an embodiment.

In some embodiments, for example for many of the dual-desorber configurations, the concentrated desiccant solution transported from the low desorber can be passed through a second heat exchanger SHX2, a low heat exchanger, where heat is transferred from the more concentrated desiccant solution for subsequent entry to an absorber (e.g., 102, 202, 302). In the absorber, ambient air in communication with the desiccant solution transfers water vapor and heat to the more concentrated desiccant solution (working solution) to form a dilute desiccant solution and a cooling fluid, generally water, can be used to remove a portion of the heat from the dilute desiccant solution. A pump (e.g., by pump 742 in FIG. 14, by pump 842 in FIG. 15, or by pump 942 in FIG. 16), can be used to return the more concentrated desiccant solution (working solution) to the heat exchanger (SHX2) for heat exchange. Depending upon ambient temperatures and the most economical way to provide cooling water, the absorber 702 can be configured as in any of FIG. 14, 15, or 16, where the cooling water is:

within a closed loop that is externally cooled in a radiator 744 external to the system and the water vapor and condensate from the low desorber 714 is vented to ambient, as shown in FIG. 14;

evaporated by the heat of dilution of the concentrated desiccant solution (working solution) in the absorber 802 and transferred to a condenser unit 804 where it is combined with the water vapor and water condensate from the low desorber 812 as shown in FIG. 15; or where water vapor generated by evaporation of the cooling fluid passed through the second heat exchanger SHX2 to further heat the water vapor from the absorber 902 and transferred the warmed water vapor to a condenser unit 904 where it is combined with the water vapor and water condensate from the low desorber 912 as shown in FIG. 16.

It should be understood that the examples and embodiments described herein are for illustrative purposes only and that various modifications or changes in light thereof will be suggested to persons skilled in the art and are to be included within the spirit and purview of this application.

In order to address various issues and advance the art, the entirety of this application (including the Title, Headings, Background, Summary, Brief Description of the Drawings, Detailed Description, Abstract, Figures, any Appendices, and otherwise) shows, by way of illustration, various embodiments in which the disclosed innovations may be practiced. The advantages and features of the application are of a representative sample of embodiments only, and are not exhaustive and/or exclusive. They are presented to assist in understanding and teach the disclosed principles.

It should be understood that they are not representative of all disclosed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various inventive concepts may be embodied as one or more methods, systems, apparatuses, and/or kits, of which at least one example has been provided. The acts performed as part of the method may be ordered in any suitable way. The configuration and ordering of constituent parts of a system or apparatus as described may be changed and/or whole constituent parts may be removed, according to any suitable manner in which the system or apparatus can be comprised. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations. Applicant reserves all rights in any and all innovations including the right to claim such innovations, file additional applications, nonprovisional applications, design applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments, claims or limitations on equivalents to the embodiments and/or claims. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Unless otherwise indicated, all numbers expressing quantities of equipment, operating conditions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the present application. Generally the term "about", as used herein when referring to a measurable value such as an amount of weight, time, temperature, etc. is meant to encompass ±10% of the stated value. For example, a value of "1,000", which would be construed from above as meaning "about 1,000", indicates a range of values from 900 to 1,100, inclusive of all values and ranges therebetween.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

All examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations that are disclosed and may not explicitly recited. As such, it should be understood that advantages, embodiments, examples, functional, features, logical, operational, organizational, structural, topological, and/or other aspects of the disclosure are not to be considered limitations on the disclosure as defined by the embodiments, examples, claims or limitations on equivalents to the embodiments, examples, and/or claims.

What is claimed is:

1. A desorber configured to desorb water from a heated working solution comprising a desiccant, the desorber comprising:
    a desorber housing comprising a first housing portion and a second housing portion, the first housing portion at least partially defining a first portion of an inner volume of the desorber housing and the second housing portion at least partially defining a second portion of the inner volume of the desorber housing;
    a first plurality of diffusion plates disposed within the first portion of the inner volume of the desorber housing, the first plurality of diffusion plates defining a plurality of fins standing proud of respective surfaces of respective diffusion plates of the first plurality of diffusion plates and defining a first plurality of apertures therethrough; and
    a second plurality of diffusion plates disposed within the second portion of the inner volume of the desorber housing, the second plurality of diffusion plates defining a second plurality of apertures therethrough, wherein
    the respective surfaces of the respective plates of the first plurality of diffusion plates and the plurality of fins are at least partially hydrophilic,
    the plurality of fins are formed from the respective surfaces of the respective diffusion plates of the first plurality of diffusion plates, the plurality of fins being configured to directly desorb at least a portion of the water from the working solution in a still air environment at a temperature of between about a boiling point temperature of the water and about the boiling point temperature of the desiccant, and
    the first plurality of apertures are dimensioned and configured such that at least the portion of the water is communicated through the first plurality of apertures.

2. The desorber of claim 1, wherein the first housing portion defines one or more of: a first working solution inlet port, a vapor outlet port, a water outlet port, or a first working solution outlet port, and wherein the second housing portion defines one or more of: a second working solution inlet port, a heat exchange fluid inlet port, a heat exchange fluid outlet port, or a second working solution outlet port.

3. The desorber of claim 1, wherein each diffusion plate of the first plurality of diffusion plates is substantially rectangular in shape, each diffusion plate comprising:
    a first portion of the first plurality of apertures being offset in a radial direction from an axis of each diffusion plate of the first plurality of diffusion plates; and
    a second portion of the first plurality of apertures being offset in an opposite radial direction from the axis of each diffusion plate of the first plurality of diffusion plates, the second portion of the first plurality of apertures being parallel to the first portion of the first plurality of apertures.

4. The desorber of claim 3, wherein the first plurality of diffusion plates are stacked together to form a first diffusion plate stack, the first diffusion plate stack at least partially defining a first fluid flow path through the first housing portion of the desorber housing, and wherein the first portion of the first plurality of apertures and the second portion of the first plurality of apertures are configured such that the first fluid flow path is reduced relative to a second fluid flow path through the second housing portion of the desorber housing, whereby water diffuses more rapidly through the first diffusion plate stack.

5. The desorber of claim 4, wherein each diffusion plate of the second plurality of diffusion plates is substantially rectangular in shape, and
    wherein at least a portion of the second plurality of apertures are defined linearly through each diffusion plate of the second plurality of diffusion plates in an axial direction and centered radially.

6. The desorber of claim 5, wherein the second plurality of diffusion plates are stacked together to form a second diffusion plate stack, the second diffusion plate stack at least partially defining a second fluid flow path through the second housing portion of the desorber housing greater than the first fluid flow path through the first housing portion of the desorber housing, and wherein the second diffusion plate stack is configured to exchange thermal energy with a heat exchange fluid.

7. The desorber of claim 1, wherein the working solution comprises an ionic liquid (IL) and water.

8. The desorber of claim 7, wherein the IL is non-crystallizable.

9. The desorber of claim 8, wherein the IL comprises one or more of: imidazolium-containing materials, 1-butyl-3-methylimidazolium bis(trifluoromethylsulfonyl)imide, 1-ethyl-3-methylimidazolium bis(trifluoromethyl-sulfonyl)amide, tetra-nbutylphosphonium trifluoromethanesulfonyl leucine, or N-alkyl-N,N-dimethylhydroxyethylammonium-bis(trifluoromethane) sulfonylimide.

10. A desorber configured to desorb water from a heated working solution comprising a desiccant, the desorber comprising:
    a desorber housing defining an inner volume of the desorber housing comprising at least one inlet and at least one outlet; and
    a plurality of diffusion plates disposed within the inner volume of the desorber housing, respective diffusion plates of the plurality of diffusion plates comprising a plurality of fins standing proud of respective surfaces of the respective diffusion plates of the plurality of diffusion plates and defining a plurality of apertures therethrough, wherein the respective surfaces of the respective plates of the plurality of diffusion plates and the plurality of fins are at least partially hydrophilic, wherein the plurality of fins are formed from the respective surfaces of the respective diffusion plates of the plurality of diffusion plates, the plurality of fins being configured to directly desorb at least a portion of the water from the working solution in a still air environment at a temperature of between about 100° C. and about 200° C., and wherein the plurality of apertures are dimensioned and configured such that at least the portion of the water is communicated through the plurality of apertures.

11. The desorber of claim 10, wherein the inner portion comprises a first housing portion and a second housing portion, wherein the first housing portion defines at least one of: a first working solution inlet port, a vapor outlet port, a water outlet port, or a first working solution outlet port, and wherein the second housing portion defines at least one of: a second working solution inlet port, a heat exchange fluid inlet port, a heat exchange fluid outlet port, or a second working solution outlet port.

12. The desorber of claim 11 wherein each diffusion plate of the plurality of diffusion plates is substantially rectangular in shape, each diffusion plate comprising:
 a first portion of the plurality of apertures being offset in a radial direction from an axis of each diffusion plate of the plurality of diffusion plates; and
 a second portion of the plurality of apertures being offset in an opposite radial direction from the axis of each diffusion plate of the plurality of diffusion plates, the second portion of the plurality of apertures being defined parallel to the first portion of the plurality of apertures.

13. The desorber of claim 12, wherein the plurality of diffusion plates comprise a first plurality of diffusion plates and a second plurality of diffusion plates, wherein the first plurality of diffusion plates are stacked together to form a first diffusion plate stack, the first diffusion plate stack at least partially defining a first fluid flow path through the first housing portion of the desorber housing, and wherein the first portion of the plurality of apertures and the second portion of the plurality of apertures are configured to reduce the first fluid flow path such that water diffuses more rapidly through the first diffusion plate stack than through a second diffusion plate stack comprising the second plurality of diffusion plates.

14. The desorber of claim 13, wherein each diffusion plate of the second plurality of diffusion plates is substantially rectangular in shape, each diffusion plate of the second plurality of diffusion plates comprising:
 a third portion of the plurality of apertures being defined linearly through each plate of the second plurality of diffusion plates in an axial direction and centered radially.

15. The desorber of claim 14, wherein the second plurality of diffusion plates are stacked together to form the second diffusion plate stack, the second diffusion plate stack at least partially defining a second fluid flow path through the second housing portion of the desorber housing greater than the first fluid flow path through the first housing portion of the desorber housing, and wherein the second diffusion plate stack is configured to exchange thermal energy with a heat exchange fluid.

16. The desorber of claim 10, wherein the working solution comprises an ionic liquid (IL) and water.

17. The desorber of claim 16, wherein the IL is non-crystallizable.

18. The desorber of claim 17, wherein the IL comprises an imidazolium-containing material.

19. A desorber configured to desorb water from a heated working solution comprising one or more desiccants, the desorber comprising:
 a desorber housing comprising a first housing portion and a second housing portion, the first housing portion at least partially defining a first portion of an inner volume of the desorber housing and the second housing portion at least partially defining a second portion of the inner volume of the desorber housing;
 a first plurality of diffusion plates disposed within the inner volume of the desorber housing, the first plurality of diffusion plates defining a plurality of fins standing proud of respective surfaces of respective diffusion plates of the first plurality of diffusion plates and at least partially defining a first plurality of apertures therethrough; and
 a second plurality of diffusion plates disposed within the inner volume of the desorber housing, the second plurality of diffusion plates defining a second plurality of apertures therethrough, wherein the respective surfaces of the respective plates of the first plurality of diffusion plates and the plurality of fins are at least partially hydrophilic, wherein the plurality of fins are formed from the respective surfaces of the respective diffusion plates of the first plurality of diffusion plates, the plurality of fins being configured to increase a contact time between the heated working solution and the respective surfaces of the respective diffusion plates of the first plurality of diffusion plates as the heated working solution is communicated across the respective surfaces, the hydrophilicity of the plurality of fins and the increased contact time being operable to cause direct desorption of at least a portion of the water from the working solution in a still air environment at a temperature of between about a boiling point temperature of the water and about the boiling point temperature of the one or more desiccants, and wherein respective apertures of the first plurality of apertures are offset a distance from corresponding respective apertures of the second plurality of apertures.

20. The desorber of claim 19, wherein the heated working solution comprises a non-crystallizable ionic liquid.

* * * * *

UNITED STATES PATENT AND TRADEMARK OFFICE
CERTIFICATE OF CORRECTION

Page 1 of 1

PATENT NO. : 11,123,682 B2
APPLICATION NO. : 16/217599
DATED : September 21, 2021
INVENTOR(S) : Moghaddam It is certified that error appears in the above-identified patent and that said Letters Patent is hereby corrected as shown below:

In the Claims

<u>Column 26</u>
Line 2, Claim 2 "ora" should read --or a--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*